(12) United States Patent
Liu et al.

(10) Patent No.: US 11,431,448 B2
(45) Date of Patent: Aug. 30, 2022

(54) METHOD AND DEVICE IN NODE FOR WIRELESS COMMUNICATION

(71) Applicants: Jin Liu, Shanghai (CN); Keying Wu, Shanghai (CN); Xiaobo Zhang, Shanghai (CN)

(72) Inventors: Jin Liu, Shanghai (CN); Keying Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 177 days.

(21) Appl. No.: 16/991,061

(22) Filed: Aug. 12, 2020

(65) Prior Publication Data

US 2021/0050966 A1 Feb. 18, 2021

(30) Foreign Application Priority Data

Aug. 15, 2019 (CN) .......................... 201910753695.3

(51) Int. Cl.
*H04L 5/00* (2006.01)
*H04W 72/04* (2009.01)
*H04L 1/00* (2006.01)

(52) U.S. Cl.
CPC .......... *H04L 5/0007* (2013.01); *H04L 1/0057* (2013.01); *H04W 72/042* (2013.01)

(58) Field of Classification Search
CPC ..... G06N 20/00; G06F 9/5011; H04B 7/0456; H04B 7/0452

USPC .......................................................... 370/329
See application file for complete search history.

(56) References Cited

U.S. PATENT DOCUMENTS

2019/0349973 A1* 11/2019 Yang ................. H04W 72/1289
2020/0106566 A1* 4/2020 Yeo ........................ H04W 28/04
2022/0029746 A1* 1/2022 Noh ........................ H04B 7/024

OTHER PUBLICATIONS

3GPP, PC5 MAC PDU Construction, Aug. 30, 2019, R2-1908748, 6 pages (Year: 2019).*

(Continued)

*Primary Examiner* — Christopher M Crutchfield
*Assistant Examiner* — Jean F Voltaire

(57) ABSTRACT

The present disclosure discloses a method and a device in a node for wireless communication. The first node transmits first information; receives second information; transmits a first bit-block set on a first time-frequency-resource block; transmits or drops transmission of a third bit-block set on a third time-frequency-resource block; and receives a second signal on a fourth time-frequency-resource block; the first information is used for indicating that the fourth time-frequency-resource block is associated with the third time-frequency-resource block; the second information indicates that the fourth time-frequency-resource block is associated with the first time-frequency-resource block; the second signal is used for indicating whether a target bit-block set is correctly received; when the first node transmits the third bit-block set on the third time-frequency-resource block, the target bit-block set is the third bit-block set, otherwise the target bit-block set is the first bit-block set.

20 Claims, 13 Drawing Sheets

(56) References Cited

OTHER PUBLICATIONS

3GPP, Scenarios and Assumptions on Sidelink Relay, MediaTek Inc, Aug. 17, 2020, R2-2006570, 4 pages (Year: 2020).*
3GPP, LS on MIMO enhancement for NR, May 13, 2019, 4 pages (Year: 2019).*

* cited by examiner

METHOD AND DEVICE IN NODE FOR WIRELESS COMMUNICATION

CROSS REFERENCE TO RELATED APPLICATIONS

This application claims the priority benefit of Chinese Patent Application No. 201910753695.3, filed on Aug. 15, 2019. The full disclosure of which is incorporated herein by reference.

BACKGROUND

Technical Field

The present disclosure relates to transmission methods and devices in wireless communication systems, and in particular to a transmission scheme and device in wireless communication relevant to Sidelink.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary session decided to conduct the study of New Radio (NR), or what is called fifth Generation (5G). The work Item (WI) of NR was approved at the 3GPP RAN #75 plenary session to standardize the NR.

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. At 3GPP RAN #80 Plenary Session, the technical Study Item (SI) of NR V2X was initialized, and later at the first AdHoc conference of RAN1 2019, it was generally agreed that the pathloss between a transmitter and a receiver in a V2X pair shall be taken as reference when calculating the V2X transmitting power.

SUMMARY

When discussing latest V2X traffic based on NR system, 3GPP has agreed that Sidelink (SL) HARQ feedback relevant with a data channel Physical Sidelink Shared Channel (PSSCH) is transmitted through a periodic Physical Sidelink Feedback Channel (PSFCH), the PSFCH and the relevant PSSCH being in a same V2X resource pool. Sidelink transmission resources of V2X are resources occupying Uplink (UL) resources of the system, and SL resources available to a transmitting user are not necessarily SL resources available to a receiving user. As a result, when the transmitting user transmits data and waits for receiving HARQ feedback on expected PSFCH, because of unavailable resources, the receiving user cannot generate HARQ feedback on the expected PSFCH.

In view of the above problem, the present disclosure provides a SL HARQ feedback scheme, which effectively solves the problem of misalignment of PSFCH resources for transmitting users and receiving users in V2X system. It should be noted that embodiments of a User Equipment (UE) in the present disclosure and characteristics of the embodiments may be applied to a base station if no conflict is incurred, and vice versa. The embodiments of the present disclosure and the characteristics of the embodiments may be mutually combined if no conflict is incurred. Further, although the original intention of the present disclosure is for single-carrier communications, the present disclosure can also be used for multi-carrier communications. And, although the original intention of the present disclosure is for single-antenna communications, the present disclosure can also be used for multi-antenna communications.

In one embodiment, terminologies in the present disclosure is interpreted with reference to definition of 3GPP specification protocol TS36 series.

In one embodiment, terminologies in the present disclosure is interpreted with reference to definition of 3GPP specification protocol TS38 series.

In one embodiment, terminologies in the present disclosure is interpreted with reference to definition of 3GPP specification protocol TS37 series.

In one embodiment, terminologies in the present disclosure is interpreted with reference to definition of specialization protocol of Institute of Electrical and Electronics Engineers (IEEE).

The present disclosure provides a method in a first node for wireless communication, comprising:
  transmitting first information;
  receiving second information;
  transmitting a first bit-block set on a first time-frequency-resource block;
  transmitting or dropping transmission of a third bit-block set on a third time-frequency-resource block; and
  receiving a second signal on a fourth time-frequency-resource block;
  wherein the first information is used for indicating Q first-type time-frequency-resource blocks, Q being a positive integer greater than 1; the first time-frequency-resource block and the third time-frequency-resource block are two of the Q first-type time-frequency-resource blocks respectively; the first information is used for indicating that the fourth time-frequency-resource block is associated with the third time-frequency-resource block; the second information indicates that the fourth time-frequency-resource block is associated with the first time-frequency-resource block; the second signal is used for indicating whether a target bit-block set is correctly received; when the first node transmits the third bit-block set on the third time-frequency-resource block, the target bit-block set is the third bit-block set, otherwise the target bit-block set is the first bit-block set.

In one embodiment, a problem needed to be solved in the present disclosure is: in V2X system, the problem of misalignment between PSFCH resources expected by a transmitting user and PSFCH resources available to a receiving user.

In one embodiment, a method in the present disclosure, comprising: establishing a correlation between the fourth time-frequency-resource block and the first time-frequency-resource block.

In one embodiment, a method in the present disclosure, comprising: establishing a correlation among the target bit-block set, the first bit-block set and the third bit-block set.

In one embodiment, the above method is characterized in that when there is no conflict between feedback for the first bit-block set and feedback for the third bit-block set, a relationship between the fourth time-frequency-resource block and the second time-frequency-resource block is established.

In one embodiment, the above method is characterized in that when there is a conflict between feedback for the first bit-block set and feedback for the third bit-block set, a relationship between the fourth time-frequency-resource block and the second time-frequency-resource block is dropped to be established.

In one embodiment, the above method is characterized in that whether the third bit-block set in the present disclosure is transmitted is used for determining whether the second signal is feedback for the first bit-block set.

In one embodiment, the above method is advantageous in that it effectively solves the problem of misalignment of PSFCH resources between a transmitting user and a receiving user inV2X system.

According to one aspect of the present disclosure, the above method is characterized in comprising:

transmitting a first signaling on the first time-frequency-resource block;

wherein the first signaling is used for scheduling the first bit-block set; the first signaling comprises third information, the third information being used for determining the third time-frequency-resource block.

According to one aspect of the present disclosure, the above method is characterized in that the first information is used for indicating that a second time-frequency-resource block is associated with the first time-frequency-resource block; the second information is used for determining that the second time-frequency-resource block cannot be used by a transmitter of the second information for transmitting the second signal.

According to one aspect of the present disclosure, the above method is characterized in comprising:

when the second information is not correctly received, receiving the second signal on the second time-frequency-resource block.

According to one aspect of the present disclosure, the above method is characterized in comprising:

receiving fourth information; and dropping reception of the second signal on the fourth time-frequency-resource block;

wherein the fourth information indicates that the fourth time-frequency-resource block cannot be used by a transmitter of the second information for transmitting a radio signal.

According to one aspect of the present disclosure, the above method is characterized in that the first node is a UE;

According to one aspect of the present disclosure, the above method is characterized in that the first node is a base station;

According to one aspect of the present disclosure, the above method is characterized in that the first node is a relay node;

The present disclosure provides a method in a second node for wireless communication, comprising:

receiving first information;

transmitting second information;

receiving a first bit-block set on a first time-frequency-resource block;

monitoring a third bit-block set on a third time-frequency-resource block;

and transmitting a second signal on a fourth time-frequency-resource block;

wherein the first information is used for indicating Q first-type time-frequency-resource blocks, Q being a positive integer greater than 1; the first time-frequency-resource block and the third time-frequency-resource block are two of the Q first-type time-frequency-resource blocks respectively; the first information is used for indicating that the fourth time-frequency-resource block is associated with the third time-frequency-resource block; the second information indicates that the fourth time-frequency-resource block is associated with the first time-frequency-resource block; the second signal indicates whether a target bit-block set is correctly received; when the third bit-block set is detected on the third time-frequency-resource block, the target bit-block set is the third bit-block set, otherwise the target bit-block set is the first bit-block set.

According to one aspect of the present disclosure, the above method is characterized in comprising:

receiving a first signaling on the first time-frequency-resource block;

wherein the first signaling is used for scheduling the first bit-block set; the first signaling comprises third information, the third information being used for determining the third time-frequency-resource block.

According to one aspect of the present disclosure, the above method is characterized in that the first information is used for indicating that a second time-frequency-resource block is associated with the first time-frequency-resource block; The second information indicates that the second time-frequency-resource block cannot be used by the second node for transmitting the second signal.

According to one aspect of the present disclosure, the above method is characterized in comprising:

when the second information is not transmitted, transmitting the second signal on the second time-frequency-resource block.

According to one aspect of the present disclosure, the above method is characterized in comprising:

receiving fourth information; and dropping transmission of the second signal on the fourth time-frequency-resource block;

wherein the fourth information indicates that the fourth time-frequency-resource block cannot be used by the second node for transmitting a radio signal.

According to one aspect of the present disclosure, the above method is characterized in that the second node is a UE;

According to one aspect of the present disclosure, the above method is characterized in that the second node is a base station;

According to one aspect of the present disclosure, the above method is characterized in that the second node is a relay node;

The present disclosure provides a first node for wireless communication, comprising:

a first transmitter, transmitting first information;

a first receiver, receiving second information;

the first transmitter, transmitting a first bit-block set on a first time-frequency-resource block;

the first transmitter, transmitting or dropping transmission of a third bit-block set on a third time-frequency-resource block; and a first receiver, receiving a second signal on a fourth time-frequency-resource block;

wherein the first information is used for indicating Q first-type time-frequency-resource blocks, Q being a positive integer greater than 1; the first time-frequency-resource block and the third time-frequency-resource block are two of the Q first-type time-frequency-resource blocks respectively; the first information is used for indicating that the fourth time-frequency-resource block is associated with the third time-frequency-resource block; the second information indicates that the fourth time-frequency-resource block is associated with the first time-frequency-resource block; the second signal is used for indicating whether a target bit-block set is correctly received; when the first node transmits the third bit-block set on the third time-frequency-resource block, the target bit-block set is the third bit-block set, otherwise the target bit-block set is the first bit-block set.

The present disclosure provides a second node for wireless communication, comprising:

a second receiver, receiving first information;

a second transmitter, transmitting second information;

the second receiver, receiving a first bit-block set on a first time-frequency-resource block;

the second receiver, monitoring a third bit-block set on a third time-frequency-resource block; and the second transmitter, transmitting a second signal on a fourth time-frequency-resource block;

wherein the first information is used for indicating Q first-type time-frequency-resource blocks, Q being a positive integer greater than 1; the first time-frequency-resource block and the third time-frequency-resource block are two of the Q first-type time-frequency-resource blocks respectively; the first information is used for indicating that the fourth time-frequency-resource block is associated with the third time-frequency-resource block; the second information indicates that the fourth time-frequency-resource block is associated with the first time-frequency-resource block; the second signal indicates whether a target bit-block set is correctly received; when the third bit-block set is detected on the third time-frequency-resource block, the target bit-block set is the third bit-block set, otherwise the target bit-block set is the first bit-block set.

In one embodiment, the present disclosure is advantageous in the following aspects:

When there is no conflict between feedback for the first bit-block set and feedback for the third bit-block set, a relationship between the fourth time-frequency-resource block and the second time-frequency-resource block is established.

When there is a conflict between feedback for the first bit-block set and feedback for the third bit-block set, a relationship between the fourth time-frequency-resource block and the second time-frequency-resource block is dropped to be established.

Whether the third bit-block set in the present disclosure is transmitted is used for determining whether the second signal is feedback for the first bit-block set.

The present disclosure effectively solves the problem of misalignment of PSFCH resources between a transmitting user and a receiving user inV2X system.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
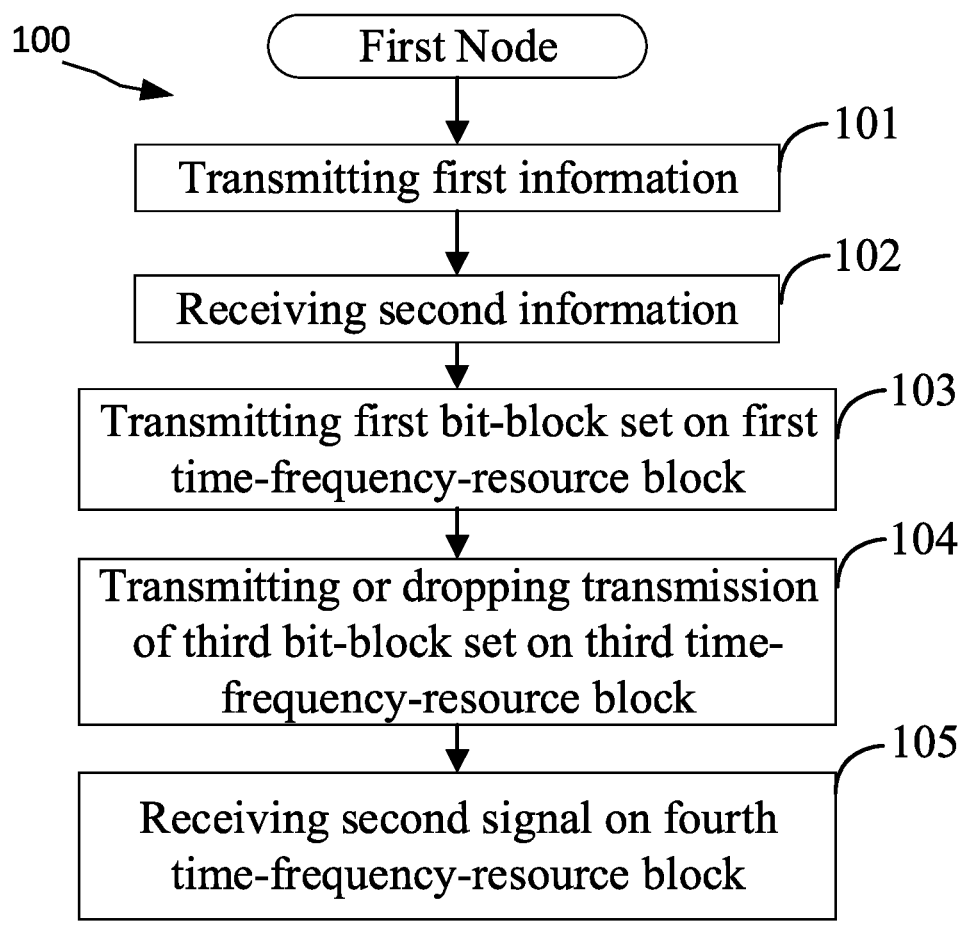
FIG. 1 illustrates a processing flowchart of a first node according to one embodiment of the present disclosure.

Embodiment 1 illustrates a processing flowchart of a first node according to one embodiment of the present disclosure, as shown in FIG. 1. In FIG. 1, each block represents a step. In Embodiment 1, a first node in the present disclosure first transmits first information in step 101; then receives second information in step 102; transmits a first bit-block set on a first time-frequency-resource block in step 103; transmits or drops transmission of a third bit-block set on a third time-frequency-resource block in step 104; and finally receives a second signal on a fourth time-frequency-resource block in step 105; the first information is used for indicating Q first-type time-frequency-resource blocks, Q being a positive integer greater than 1; the first time-frequency-resource block and the third time-frequency-resource block are two of the Q first-type time-frequency-resource blocks respectively; the first information is used for indicating that the fourth time-frequency-resource block is associated with the third time-frequency-resource block; the second information indicates that the fourth time-frequency-resource block is associated with the first time-frequency-resource block; the second signal is used for indicating whether a target bit-block set is correctly received; when the first node transmits the third bit-block set on the third time-frequency-resource block, the target bit-block set is the third bit-block set, otherwise the target bit-block set is the first bit-block set.

In one embodiment, the first information is Broadcast.

In one embodiment, the first information is Groupcast.

In one embodiment, the first information is Unicast.

In one embodiment, the first information is Cell-specific.

In one embodiment, the first information is UE-specific.

In one embodiment, the first information is transmitted through a Sidelink Shared Channel (SL-SCH).

In one embodiment, the first information is transmitted through a Physical Sidelink Control Channel (PSCCH).

In one embodiment, the first information is transmitted through a Physical Sidelink Shared Channel (PSSCH).

In one embodiment, the first information is transmitted through a PSCCH and a PSSCH.

In one embodiment, the first information is transmitted through a Downlink Shared Channel (DL-SCH).

In one embodiment, the first information is transmitted through a Physical Downlink Control Channel (PDCCH).

In one embodiment, the first information is transmitted through a Physical Downlink Shared Channel (PDSCH).

In one embodiment, the first information is transmitted through a PDCCH and a PDSCH.

In one embodiment, the first information comprises all or part of a higher-layer signaling.

In one embodiment, the first information comprises all or part of a Radio Resource Control (RRC) layer signaling.

In one embodiment, the first information comprises one or more Fields in an RRC Information Element (IE).

In one embodiment, the definition of the RRC IE refers to 3GPP TS38.331, chapter 6.3.

In one embodiment, the first information comprises one or more fields in an SIB.

In one embodiment, the first information comprises all or part of a Multimedia Access Control (MAC) layer signaling.

In one embodiment, the first information comprises one or more fields in a MAC Control Element (CE).

In one embodiment, the first information comprises one or more fields in a Physical Layer (PHY) layer signaling.

In one embodiment, the first information comprises one or more fields in a Sidelink Control Information (SCI).

In one embodiment, the definition of the SCI refers to 3GPP TS36.212, chapter 5.4.3.

In one embodiment, the first information comprises one or more fields in Downlink Control Information (DCI).

In one embodiment, the definition of the DCI refers to 3GPP TS36.212, chapter 5.3.3.

In one embodiment, the first information is semi-statically configured.

In one embodiment, the first information is dynamically configured.

In one embodiment, the first information is used for indicating resources of Sidelink (SL).

In one embodiment, the first information is used for indicating Q first-type time-frequency-resource blocks, Q being a positive integer greater than 1.

In one embodiment, a first given time-frequency-resource block is a first-type air-interface-resource block among the Q first-type time-frequency-resource blocks, and the first information comprises a time-domain-resource unit occupied by the first given time-frequency-resource block and a time-domain offset of a first-type time-frequency-resource block other than the first given time-frequency-resource block among the Q first-type time-frequency-resource blocks relative to the first given time-frequency-resource block.

In one subembodiment of the above embodiment, the time-domain offset of a first-type time-frequency-resource block other than the first given time-frequency-resource block among the Q first-type time-frequency-resource blocks relative to the first given time-frequency-resource block comprises a positive integer of time-domain-resource unit(s).

In one embodiment, a first given time-frequency-resource block is a first-type time-frequency-resource block among the Q first-type time-frequency-resource blocks, and the first information comprises a frequency-domain-resource unit occupied by the first given time-frequency-resource block and a frequency-domain offset of a first-type time-frequency-resource block other than the first given time-frequency-resource block among the Q first-type time-frequency-resource blocks relative to the first given time-frequency-resource block.

In one subembodiment of the above embodiment, the frequency-domain offset of a first-type time-frequency-resource block other than the first given time-frequency-resource block among the Q first-type time-frequency-resource blocks relative to the first given time-frequency-resource block comprises a positive integer of frequency-domain-resource unit(s).

In one embodiment, a first given time-frequency-resource block is a first-type time-frequency-resource block among the Q first-type time-frequency-resource blocks, and the first information comprises a time-frequency-resource unit occupied by the first given time-frequency-resource block as well as a time-domain offset and a frequency-domain offset of a first-type time-frequency-resource block other than the first given time-frequency-resource block among the Q first-type time-frequency-resource blocks relative to the first given time-frequency-resource block.

In one embodiment, the first information comprises a first bitmap, the first bitmap comprising a positive integer number of bits arranged in order.

In one embodiment, the first bitmap respectively corresponds to Q0 first-type time-frequency-resource blocks, the Q0 first-type time-frequency-resource blocks comprising the Q first-type time-frequency-resource blocks, the first bitmap being used for indicating the Q first-type time-frequency-resource blocks out of the Q0 first-type time-frequency-resource blocks, Q0 being a positive integer not less than the Q.

In one embodiment, the first information comprises uplink and downlink resource allocation.

In one embodiment, the first information comprises TDD-UL-DL-Config.

In one embodiment, the TDD-UL-DL-Config is an RRC IE.

In one embodiment, the definition of the TDD-UL-DL-Config refers to 3GPP TS38. 331, chapter 6.3.2.

In one embodiment, the first information comprises a parameter TDD-UL-DL-ConfigurationCommon.

In one embodiment, the definition of the parameter TDD-UL-DL-ConfigurationCommon refers to 3GPP TS38.331.

In one embodiment, the first information comprises a parameter TDD-UL-DL-ConfigDedicated.

In one embodiment, the definition of the parameter TDD-UL-DL-ConfigDedicated refers to 3GPP TS38.331.

In one embodiment, the first information comprises a parameter TTDD-UL-DL-Pattern.

In one embodiment, the definition of the parameter TDD-UL-DL-Pattern refers to 3GPP TS38. 331, chapter 6.3.2.

In one embodiment, the first information comprises a slot format.

In one embodiment, the first information comprises a Slot Format Indicator (SFI).

In one embodiment, the slot format is a field in a dynamic signaling.

In one embodiment, a definition of the slot format refers to 3GPP TS38. 213, chapter 11.1.1.

In one embodiment, the second information is Broadcast.

In one embodiment, the second information is Groupcast.

In one embodiment, the second information is Unicast.

In one embodiment, the second information is Cell-specific.

In one embodiment, the second information is UE-specific.

In one embodiment, the second information is transmitted through a SL-SCH.

In one embodiment, the second information is transmitted through a PSCCH.

In one embodiment, the second information is transmitted through a PSSCH.

In one embodiment, the second information is transmitted through a PSCCH and a PSSCH.

In one embodiment, the second information is transmitted through a DL-SCH.

In one embodiment, the second information is transmitted through a PDCCH.

In one embodiment, the second information is transmitted through a PDSCH.

In one embodiment, the second information is transmitted through a PDCCH and a PDSCH.

In one embodiment, the second information comprises all or part of a higher-layer signaling.

In one embodiment, the second information comprises all or part of an RRC signaling.

In one embodiment, the second information comprises one or more fields of an RRC IE.

In one embodiment, the second information comprises all or part of a MAC layer signaling.

In one embodiment, the second information comprises one or more fields of a MAC CE.

In one embodiment, the second information comprises one or more fields of a PHY layer signaling.

In one embodiment, the second information comprises one or more fields of SCI.

In one embodiment, the second information comprises one or more fields of DCI.

In one embodiment, the second information is semi-statically configured.

In one embodiment, the second information is dynamically configured.

In one embodiment, the second information comprises uplink and downlink resource allocation.

In one embodiment, the second information comprises TDD-UL-DL-Config.

In one embodiment, the second information comprises a parameter TDD-UL-DL-ConfigurationCommon.

In one embodiment, the second information comprises a parameter TDD-UL-DL-ConfigDedicated.

In one embodiment, the second information comprises a parameter TTDD-UL-DL-Pattern.

In one embodiment, the second information comprises a slot format.

In one embodiment, the second information comprises an SFI.

In one embodiment, the first bit-block set is a baseband signal.

In one embodiment, the first bit-block set is a radio signal.

In one embodiment, the first bit-block set is transmitted through a PSCCH.

In one embodiment, the first bit-block set is transmitted through a PSSCH.

In one embodiment, the first bit-block set is transmitted through a PSCCH and a PSSCH.

In one embodiment, the first bit-block set is Broadcast.

In one embodiment, the first bit-block set is Groupcast.

In one embodiment, the first bit-block set is Unicast.

In one embodiment, the first bit-block set is Cell-specific.

In one embodiment, the first bit-block set is UE-specific.

In one embodiment, the first bit-block set comprises a positive integer number of first-type bit block(s), and any first-type bit block among the positive integer number of first-type bit block(s) comprises a positive integer number of bit(s) arranged in order.

In one embodiment, the first bit-block set comprises a positive integer number of Code Block(s)(CB).

In one embodiment, the first bit-block set comprises a positive integer number of Code Block Group(s)(CBG).

In one embodiment, the first bit-block set comprises a Transport Block (TB).

In one embodiment, the positive integer number of first-type bit block(s) comprised in the first bit-block set is(are) respectively a positive integer number of CB(s).

In one embodiment, the positive integer number of first-type bit block(s) comprised in the first bit-block set is(are) respectively a positive integer number of CBG(s).

In one embodiment, the positive integer number of first-type bit block(s) comprised in the first bit-block set is(are) respectively a positive integer number of TB(s).

In one embodiment, any first-type bit block among the positive integer number of first-type bit block(s) comprised in the first bit-block set comprises a positive integer number of CB(s).

In one embodiment, any first-type bit block among the positive integer number of first-type bit block(s) comprised in the first bit-block set comprises a positive integer number of CBG(s).

In one embodiment, any first-type bit block among the positive integer number of first-type bit block(s) comprised in the first bit-block set comprises a positive integer number of TB(s).

In one embodiment, the first bit-block set is obtained by a TB subjected to transport block-level Cyclic Redundancy Check (CRC) attachment.

In one embodiment, the first bit-block set is a CB in a code block obtained by a TB sequentially subjected to TB-level CRC attachment, Code Block Segmentation, and code-block-level CRC attachment.

In one embodiment, all or part of bits of the first bit-block set is sequentially subjected to TB-level CRC attachment, code block segmentation, code-block-level CRC attachment, channel coding, rate matching, code-block concatenation, scrambling, modulation, layer mapping, antenna port mapping, mapping to physical resource blocks, baseband signal generation as well as modulation and upconversion.

In one embodiment, the first bit block is an output after sequentially subjected to a modulation mapper, a layer mapper, precoding, a resource element mapper, and multi-carrier symbol generation.

In one embodiment, the channel coding is based on a polar code.

In one embodiment, the channel coding is based on a Low-density Parity-Check (LDPC) code.

In one embodiment, the first bit-block set comprises data transmitted on a Sidelink Shared Channel (SL-SCH).

In one embodiment, the first bit-block set comprises all or part of a higher-layer signaling.

In one embodiment, the first bit-block set comprises all or part of an RRC signaling.

In one embodiment, the first bit-block set comprises one or more fields of an RRC IE.

In one embodiment, the first bit-block set comprises all or part of a MAC layer signaling.

In one embodiment, the first bit-block set comprises one or more fields of a MAC CE.

In one embodiment, the first bit-block set comprises one or more fields of a PHY layer signaling.

In one embodiment, the first bit-block set comprises one or more fields of SCI.

In one embodiment, the first bit-block set does not comprise SCI.

In one embodiment, the first bit-block set comprises a Reference Signal (RS).

In one embodiment, the first bit-block set does not comprise an RS.

In one embodiment, the first bit-block set comprises a Demodulation Reference Signal (DMRS).

In one embodiment, the first bit-block set does not comprise an DMRS.

In one embodiment, the first bit-block set comprises a Channel State Information-Reference Signal (CSI-RS).

In one embodiment, the first bit-block set does not comprise a CSI-RS.

In one embodiment, the first bit-block set comprises a Sidelink DMRS (SL DMRS).

In one embodiment, the first bit-block set does not comprise an SL DMRS.

In one embodiment, the first bit-block set comprises a PSSCH DMRS (that is, a DMRS demodulating a PSSCH).

In one embodiment, the first bit-block set does not comprise a PSSCH DMRS.

In one embodiment, the first bit-block set comprises a PSCCH DMRS (that is, a DMRS demodulating a PSCCH).

In one embodiment, the first bit-block set does not comprise a PSCCH DMRS.

In one embodiment, the first bit-block set comprises a SL CSI-RS.

In one embodiment, the first bit-block set does not comprise an SL CSI-RS.

In one embodiment, the third bit-block set is a baseband signal.

In one embodiment, the third bit-block set is a radio signal.

In one embodiment, the third bit-block set is transmitted through a PSCCH.

In one embodiment, the third bit-block set is transmitted through a PSSCH.

In one embodiment, the third bit-block set is transmitted through a PSCCH and a PSSCH.

In one embodiment, the third bit-block set is Broadcast.

In one embodiment, the third bit-block set is Groupcast.

In one embodiment, the third bit-block set is Unicast.

In one embodiment, the third bit-block set is Cell-specific.

In one embodiment, the third bit-block set is UE-specific.

In one embodiment, the third bit-block set comprises a positive integer number of third-type bit block(s), and any of the positive integer number of third-type bit block(s) comprises a positive integer number of bit(s) arranged in order.

In one embodiment, the third bit-block set comprises a positive integer number of CB(s).

In one embodiment, the third bit-block set comprises a positive integer number of CBG(s).

In one embodiment, the third bit-block set comprises one TB.

In one embodiment, the positive integer number of third-type bit block(s) comprised in the third bit-block set is(are) respectively a positive integer number of CB(s).

In one embodiment, the positive integer number of third-type bit block(s) comprised in the third bit-block set is(are) respectively a positive integer number of CBG(s).

In one embodiment, the positive integer number of third-type bit block(s) comprised in the third bit-block set is(are) respectively a positive integer number of TB(s).

In one embodiment, any of the positive integer number of third-type bit block(s) comprised in the third bit-block set comprises a positive integer number of CB(s).

In one embodiment, any of the positive integer number of third-type bit block(s) comprised in the third bit-block set comprises a positive integer number of CBG(s).

In one embodiment, any of the positive integer number of third-type bit block(s) comprised in the third bit-block set comprises a positive integer number of TB(s).

In one embodiment, the third bit-block set is obtained by a TB subjected to a transport-block-level CRC attachment.

In one embodiment, the third bit-block set is a CB in a code block obtained by a TB sequentially subjected to TB-level CRC attachment, Code Block Segmentation, and code-block-level CRC attachment.

In one embodiment, all or part of bits of the third bit-block set is sequentially subjected to TB-level CRC attachment, code block segmentation, code-block-level CRC attachment, channel coding, rate matching, code-block concatenation, scrambling, modulation, layer mapping, antenna port mapping, mapping to physical resource blocks, baseband signal generation as well as modulation and upconversion.

In one embodiment, the third bit-block set is an output after sequentially subjected to a modulation mapper, a layer mapper, precoding, an RE mapper and multi-carrier symbol generation.

In one embodiment, the third bit-block set comprises data transmitted on a SL-SCH.

In one embodiment, the third bit-block set comprises all or part of a higher-layer signaling.

In one embodiment, the third bit-block set comprises all or part of an RRC signaling.

In one embodiment, the third bit-block set comprises one or more fields of an RRC IE.

In one embodiment, the third bit-block set comprises all or part of a MAC layer signaling.

In one embodiment, the third bit-block set comprises one or more fields of a MAC CE.

In one embodiment, the third bit-block set comprises one or more fields of a PHY layer signaling.

In one embodiment, the third bit-block set comprises one or more fields of SCI.

In one embodiment, the third bit-block set does not comprise SCI.

In one embodiment, the third bit-block set comprises an RS.

In one embodiment, the third bit-block set does not comprise an RS.

In one embodiment, the third bit-block set comprises an DMRS.

In one embodiment, the third bit-block set does not comprise an DMRS.

In one embodiment, the third bit-block set comprises a CSI-RS.

In one embodiment, the third bit-block set does not comprise a CSI-RS.

In one embodiment, the third bit-block set comprises an SL DMRS.

In one embodiment, the third bit-block set does not comprise an SL DMRS.

In one embodiment, the third bit-block set comprises a PSSCH DMRS.

In one embodiment, the third bit-block set does not comprise a PSSCH DMRS.

In one embodiment, the third bit-block set comprises a PSCCH DMRS.

In one embodiment, the third bit-block set does not comprise a PSCCH DMRS.

In one embodiment, the third bit-block set comprises an SL CSI-RS.

In one embodiment, the third bit-block set does not comprise an SL CSI-RS.

In one embodiment, the target bit-block set is the first bit-block set.

In one embodiment, the target bit-block set is the third bit-block set.

In one embodiment, the target bit-block set is one of the first bit-block set or the third bit-block set.

In one embodiment, the target bit-block set comprises the first bit-block set and the third bit-block set.

In one embodiment, the target bit-block set comprises a positive integer number of first-type target bit block(s), any of the positive integer number of first-type target bit block(s) comprising a positive integer number of bit(s) arranged in order.

In one embodiment, the positive integer number of first-type target bit block(s) in the target bit-block set respectively correspond(s) to the positive integer number of first-type bit block(s) in the first bit-block set.

In one embodiment, the positive integer number of first-type target bit block(s) in the target bit-block set is(are) the positive integer number of first-type bit block(s) in the first bit-block set respectively.

In one embodiment, the positive integer number of first-type target bit block(s) in the target bit-block set respectively correspond(s) to the positive integer number of third-type bit block(s) in the third bit-block set.

In one embodiment, the positive integer number of first-type target bit block(s) in the target bit-block set is(are) the positive integer number of third-type bit block(s) in the third bit-block set respectively.

In one embodiment, the target bit-block set is the first bit-block set, the positive integer number of first-type target bit block(s) in the target bit-block set is(are) the positive integer number of first-type bit block(s) in the first bit-block set respectively.

In one embodiment, the target bit-block set is the third bit-block set, the positive integer number of first-type target bit block(s) in the target bit-block set is(are) the positive integer number of third-type bit block(s) in the third bit-block set respectively.

Embodiment 2

Figure 2:
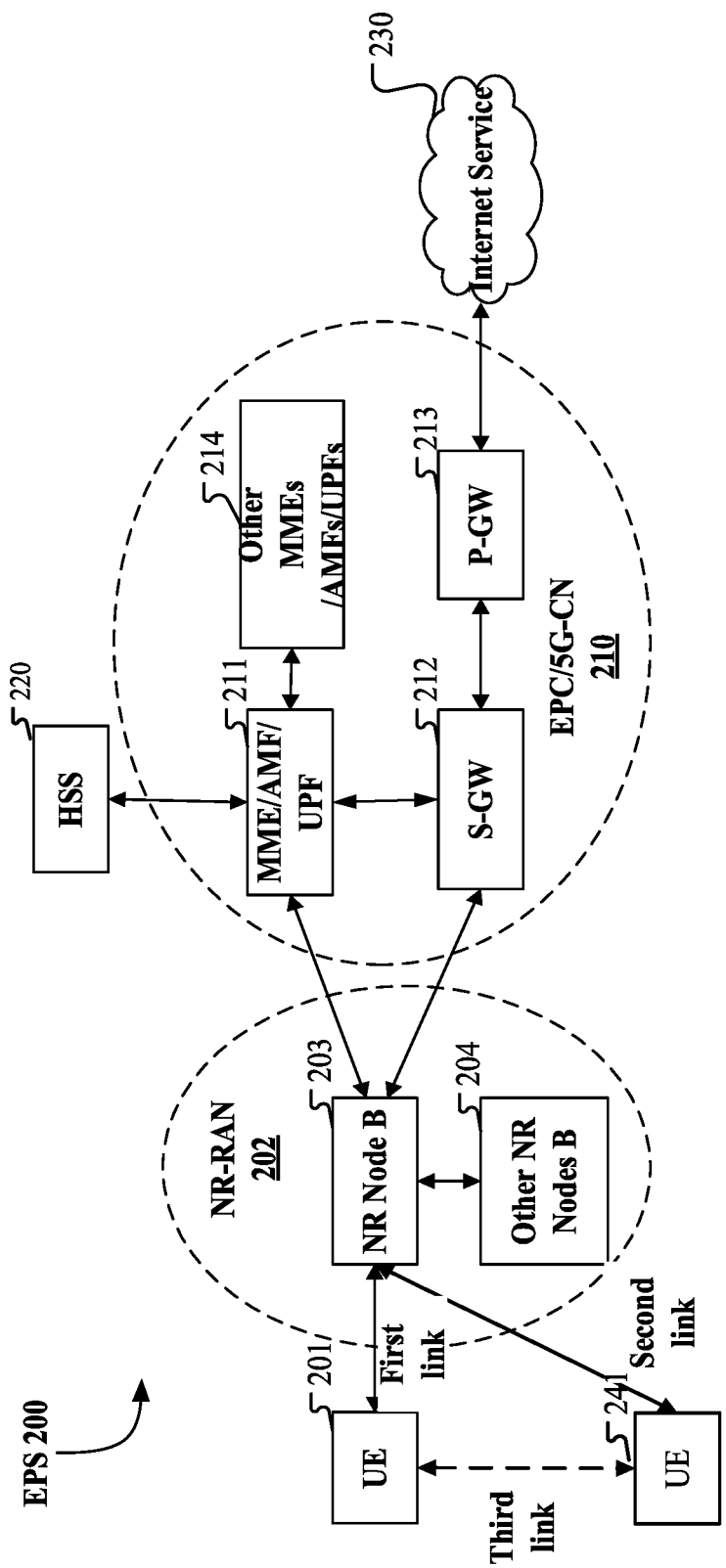
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 illustrates a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or some other applicable terms. The EPS 200 may comprise one or more UEs 201, a NG-RAN 202, an Evolved Packet Core/5G-Core Network (EPC/5G-CN) 210, a Home Subscriber Server (HSS) 220 and an Internet Service 230. The EPS may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN comprises an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmit-Receive Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrowband Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the first node in the present disclosure comprises the UE 201.

In one embodiment, the second node in the present disclosure comprises the UE 241.

In one embodiment, the UE in the present disclosure comprises the UE 201.

In one embodiment, the UE in the present disclosure comprises the UE 241.

In one embodiment, the UE 201 supports SL transmission.
In one embodiment, the UE 201 supports a PC5 interface.
In one embodiment, the UE 241 supports SL transmission.
In one embodiment, the UE 241 supports a PC5 interface.

In one embodiment, a transmitter of the first information in the present disclosure comprises the UE 201.

In one embodiment, a receiver of the first information in the present disclosure comprises the UE 241.

In one embodiment, a transmitter of the second information in the present disclosure comprises the UE 241.

In one embodiment, a receiver of the second information in the present disclosure comprises the UE 201.

In one embodiment, a transmitter of the first signaling in the present disclosure comprises the UE 201.

In one embodiment, a receiver of the first signaling in the present disclosure comprises the UE 241.

In one embodiment, a transmitter of the first bit-block set in the present disclosure comprises the UE 201.

In one embodiment, a receiver of the first bit-block set in the present disclosure comprises the UE 241.

In one embodiment, a transmitter of the third bit-block set in the present disclosure comprises the UE 201.

In one embodiment, a receiver of the third bit-block set in the present disclosure comprises the UE 241.

In one embodiment, a transmitter of the second signal in the present disclosure comprises the UE 241.

In one embodiment, a receiver of the second signal in the present disclosure comprises the UE 201.

In one embodiment, a transmitter of the fourth information in the present disclosure comprises the gNB 203.

In one embodiment, a transmitter of the fourth information in the present disclosure comprises the UE 241.

In one embodiment, a receiver of the fourth information in the present disclosure comprises the UE 201.

In one embodiment, a receiver of the fourth information in the present disclosure comprises the UE 241.

Embodiment 3

Figure 3:
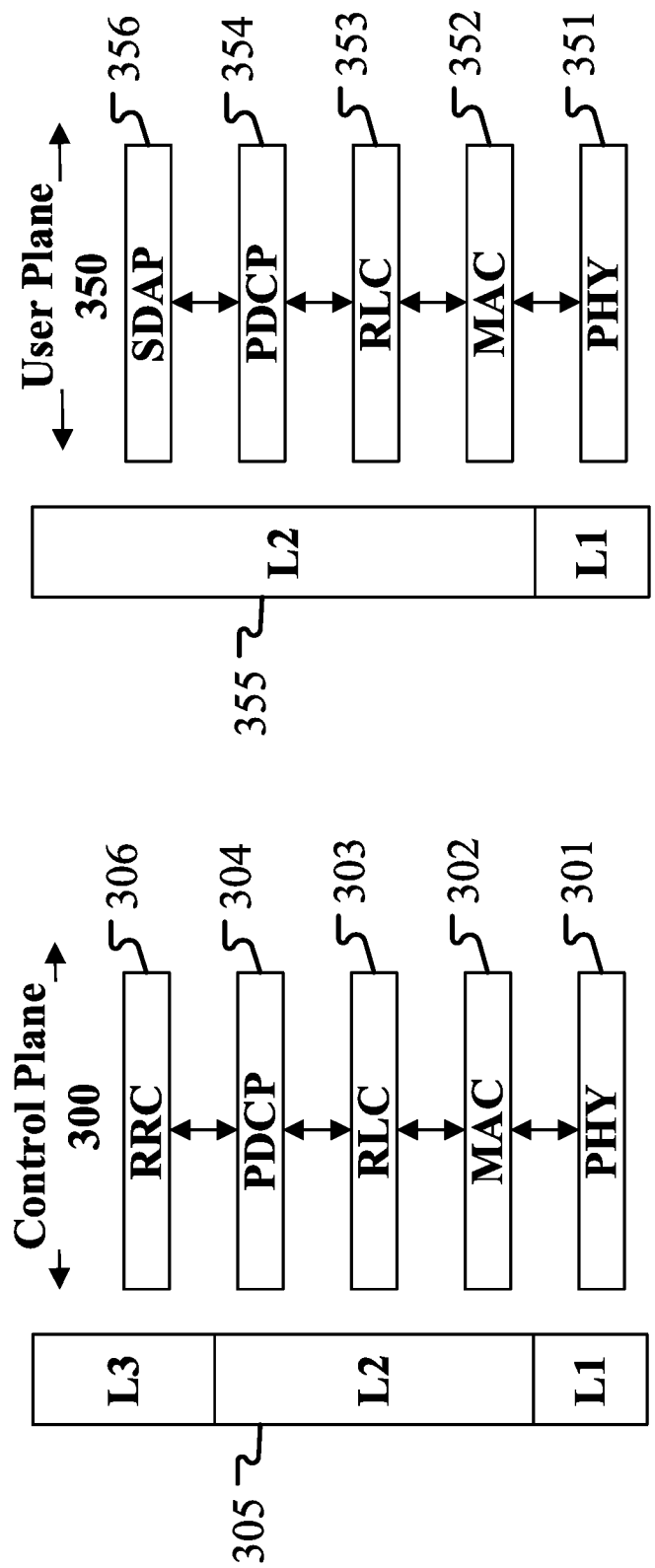
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, an RSU in gNB or V2X) and a second communication node (gNB, an RSU in UE or V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of a link between a first communication node and a second communication node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not shown in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information in the present disclosure is generated by the PHY 301.

In one embodiment, the first information in the present disclosure is generated by the RRC sublayer 306.

In one embodiment, the first information in the present disclosure is transmitted to the PHY 301 via the MAC sublayer 302.

In one embodiment, the second information in the present disclosure is generated by the RRC sublayer 306.

In one embodiment, the second information in the present disclosure is transmitted to the PHY 301 via the MAC sublayer 302.

In one embodiment, the first bit-block set in the present disclosure is generated by the SDAP sublayer 356.

In one embodiment, the first bit-block set in the present disclosure is transmitted to the PHY 351 via the MAC sublayer 352.

In one embodiment, the first bit-block set in the present disclosure is generated by the RRC sublayer 306.

In one embodiment, the first bit-block set in the present disclosure is transmitted to the PHY 301 via the MAC sublayer 302.

In one embodiment, the third bit-block set in the present disclosure is generated by the SDAP sublayer 356.

In one embodiment, the third bit-block set in the present disclosure is transmitted to the PHY 351 via the MAC sublayer 352.

In one embodiment, the third bit-block set in the present disclosure is generated by the RRC sublayer 306.

In one embodiment, the third bit-block set in the present disclosure is transmitted to the PHY 301 via the MAC sublayer 302.

In one embodiment, the second signal in the present disclosure is generated by the PHY 301.

In one embodiment, the second signal in the present disclosure is generated by the RRC sublayer 306.

In one embodiment, the second signal in the present disclosure is transmitted to the PHY 301 via the MAC sublayer 302.

In one embodiment, the fourth information in the present disclosure is generated by the PHY 301.

Embodiment 4

Figure 4:
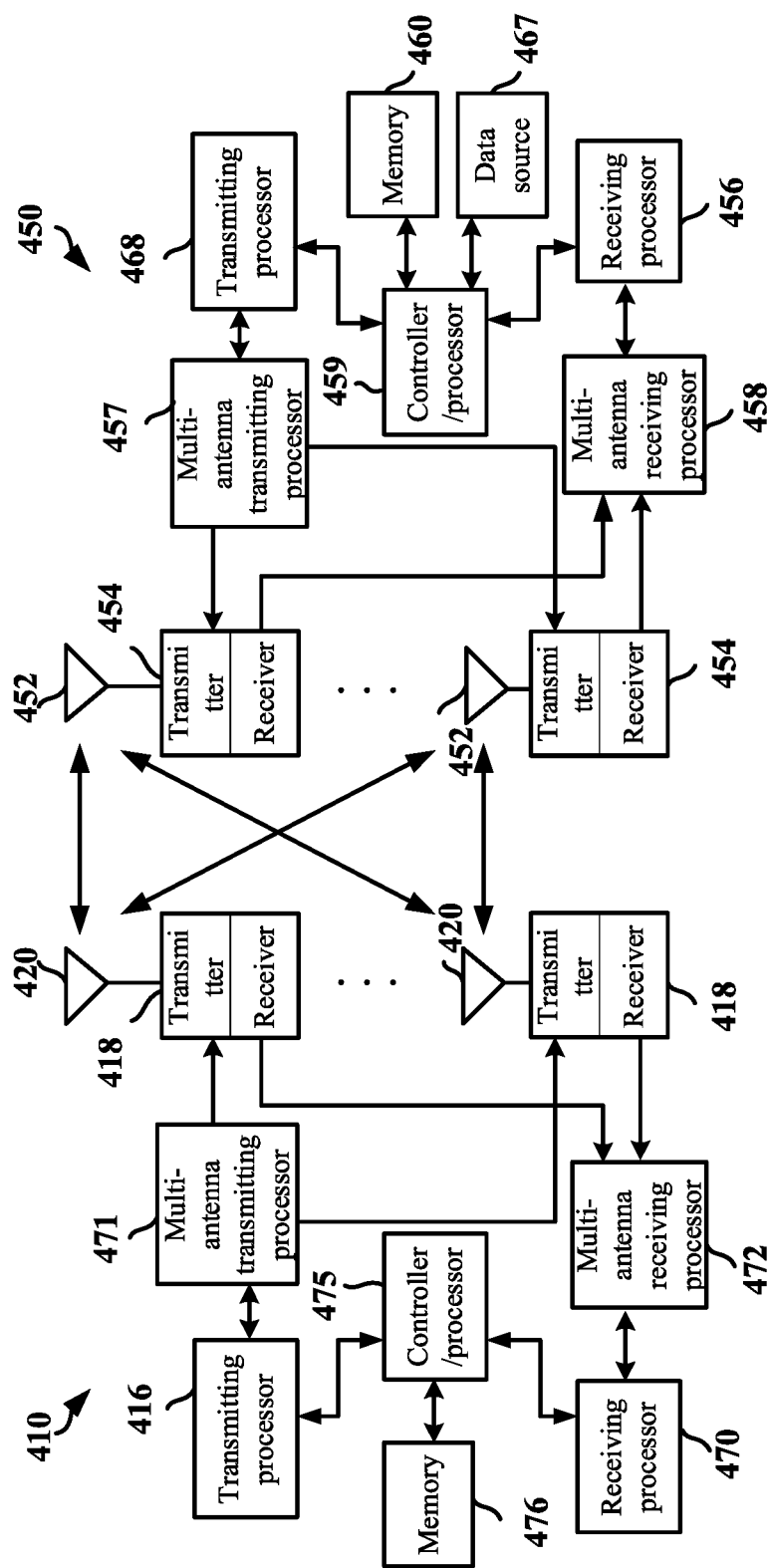
FIG. 4 illustrates a schematic diagram of a first communication equipment and a second communication equipment according to one embodiment of the present disclosure.

Embodiment 4 illustrates a schematic diagram of a first communication device and a second communication device in the present disclosure, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In the transmission from the first communication device 410 to the second communication device 450, at the first communication device 410, a higher layer packet from the core network is provided to the controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resource allocation for the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In the transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In the transmission from the second communication device to the first communication device, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present disclosure comprises the second communication device 450, and the second node in the present disclosure comprises the first communication device 410.

In one subembodiment of the above embodiment, the first node is a UE, and the second node is a UE.

In one subembodiment of the above embodiment, the first node is a UE, and the second node is a relay node.

In one subembodiment of the above embodiment, the first node is a relay node, and the second node is a UE.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one subembodiment of the above embodiment, the first communication device 410 comprises: at least one controller/processor; the at least one controller/processor is responsible for error detection using ACK and/or NACK protocols as a way to support HARQ operation.

In one embodiment, the second communication device 450 comprises: at least one processor and at least one memory, and the at least one memory includes computer program codes; the at least one memory and the computer program codes are configured to be used in collaboration with the at least one processor. The second communication device 450 at least: transmits first information; receives second information; transmits a first bit-block set on a first time-frequency-resource block; transmits or drops transmission of a third bit-block set on a third time-frequency-resource block; and receives a second signal on a fourth time-frequency-resource block; the first information is used for indicating Q first-type time-frequency-resource blocks, Q being a positive integer greater than 1; the first time-frequency-resource block and the third time-frequency-resource block are two of the Q first-type time-frequency-resource blocks respectively; the first information is used for indicating that the fourth time-frequency-resource block is associated with the third time-frequency-resource block; the second information indicates that the fourth time-frequency-resource block is associated with the first time-frequency-resource block; the second signal is used for indicating whether a target bit-block set is correctly received; when the first node transmits the third bit-block set on the third time-frequency-resource block, the target bit-block set is the third bit-block set, otherwise the target bit-block set is the first bit-block set.

In one embodiment, the second communication device 450 comprises a memory that stores a computer readable instruction program. The computer readable instruction program generates an action when executed by at least one processor. The action includes: transmitting first information; receiving second information; transmitting a first bit-block set on a first time-frequency-resource block; transmitting or dropping transmission of a third bit-block set on a third time-frequency-resource block; and receiving a second signal on a fourth time-frequency-resource block; wherein the first information is used for indicating Q first-type time-frequency-resource blocks, Q being a positive integer greater than 1; the first time-frequency-resource block and the third time-frequency-resource block are two of the Q first-type time-frequency-resource blocks respectively; the first information is used for indicating that the fourth time-frequency-resource block is associated with the third time-frequency-resource block; the second information indicates that the fourth time-frequency-resource block is associated with the first time-frequency-resource block; and the second signal is used for indicating whether a target bit-block set is correctly received; when the first node transmits the third bit-block set on the third time-frequency-resource block, the target bit-block set is the third bit-block set, otherwise the target bit-block set is the first bit-block set.

In one embodiment, the first communication device 410 comprises: at least one processor and at least one memory, and the at least one memory includes computer program codes; the at least one memory and the computer program codes are configured to be used in collaboration with the at least one processor. The first communication device 410 at least: receives first information; transmits second information; receives a first bit-block set on a first time-frequency-resource block; monitors a third bit-block set on a third time-frequency-resource block; and transmits a second signal on a fourth time-frequency-resource block; wherein the first information is used for indicating Q first-type time-frequency-resource blocks, Q being a positive integer greater than 1; the first time-frequency-resource block and the third time-frequency-resource block are two of the Q first-type time-frequency-resource blocks respectively; the first information is used for indicating that the fourth time-frequency-resource block is associated with the third time-frequency-resource block; the second information indicates that the fourth time-frequency-resource block is associated with the first time-frequency-resource block; the second signal indicates whether a target bit-block set is correctly received; when the third signaling is detected on the third time-frequency-resource block, the target bit-block set is the third bit-block set, otherwise the target bit-block set is the first bit-block set.

In one embodiment, the first communication device 410 comprises a memory that stores a computer readable instruction program. The computer readable instruction program generates an action when executed by at least one processor. The action includes: receiving first information; transmitting second information; receiving a first bit-block set on a first time-frequency-resource block; monitoring a third bit-block set on a third time-frequency-resource block; and transmitting a second signal on a fourth time-frequency-resource block; wherein the first information is used for indicating Q first-type time-frequency-resource blocks, Q being a positive integer greater than 1; the first time-frequency-resource block and the third time-frequency-resource block are two of the Q first-type time-frequency-resource blocks respectively; the first information is used for indicating that the fourth time-frequency-resource block is associated with the third time-frequency-resource block; the second information indicates that the fourth time-frequency-resource block is associated with the first time-frequency-resource block; the second signal indicates whether a target bit-block set is correctly received; when the third signaling is detected on the third time-frequency-resource block, the target bit-block set is the third bit-block set, otherwise the target bit-block set is the first bit-block set.

In one embodiment, at least one of the antenna 452, the transmitter 454, the multi-antenna transmitting processor 458, the transmitting processor 468, the controller/processor 459, the memory 460, or the data sources 467 is used to transmit first information in the present disclosure;

In one embodiment, at least one of the antenna 452, the receiver 454, the multi-antenna receiving processor 458, the receiving processor 456, the controller/processor 459, the memory 460, or the data source 467 is used to receive second information in the present disclosure.

In one embodiment, at least one of the antenna 452, the transmitter 454, the multi-antenna transmission processor 458, the transmitting processor 468, the controller/processor 459, the memory 460, or the data source 467 is used to transmit a first bit-block set on a first time-frequency-resource block in the present disclosure.

In one embodiment, at least one of the antenna 452, the transmitter 454, the multi-antenna transmission processor 458, the transmitting processor 468, the controller/processor 459, the memory 460, or the data source 467 is used to transmit a third bit-block set on a first time-frequency-resource block in the present disclosure.

In one embodiment, at least one of the antenna 452, the transmitter 454, the multi-antenna transmission processor 458, the transmitting processor 468, the controller/processor 459, the memory 460, or the data source 467 is used to drop transmission of a third bit-block set on a first time-frequency-resource block in the present disclosure.

In one embodiment, at least one of the antenna 452, the receiver 454, the multi-antenna receiving processor 458, the receiving processor 456, the controller/processor 459, the memory 460, or the data source 467 is used to receive a second signal on a fourth time-frequency-resource block in the present disclosure.

In one embodiment, at least one of the antenna 452, the transmitter 454, the multi-antenna transmission processor 458, the transmitting processor 468, the controller/processor 459, the memory 460, or the data source 467 is used to transmit a first signaling on a first time-frequency-resource block in the present disclosure.

In one embodiment, at least one of the antenna 452, the receiver 454, the multi-antenna receiving processor 458, the receiving processor 456, the controller/processor 459, the memory 460, or the data source 467 is used to receive a second signal on a second time-frequency-resource block in the present disclosure.

In one embodiment, at least one of the antenna 452, the receiver 454, the multi-antenna receiving processor 458, the receiving processor 456, the controller/processor 459, the memory 460, or the data source 467 is used to receive fourth information in the present disclosure.

In one embodiment, at least one of the antenna 420, the receiver 418, the multi-antenna receiving processor 472, the receiving processor 470, the controller/processor 475, or the memory 476 is used to receive first information in the present disclosure.

In one embodiment, at least one of the antenna 420, the transmitter 418, the multi-antenna transmitting processor 471, the transmitting processor 416, the controller/processor 475, or the memory 476 is used to transmit second information in the present disclosure.

In one embodiment, at least one of the antenna 420, the receiver 418, the multi-antenna receiving processor 472, the receiving processor 470, the controller/processor 475, or the memory 476 is used to receive a first bit-block set on a first time-frequency-resource block in the present disclosure.

In one embodiment, at least one of the antenna 420, the receiver 418, the multi-antenna receiving processor 472, the receiving processor 470, the controller/processor 475, or the memory 476 is used to monitor a third bit-block set on a third time-frequency-resource block in the present disclosure.

In one embodiment, at least one of the antenna 420, the transmitter 418, the multi-antenna transmitting processor 471, the transmitting processor 416, the controller/processor 475, or the memory 476 is used to transmit a second signal on a fourth time-frequency-resource block in the present disclosure.

In one embodiment, at least one of the antenna 420, the receiver 418, the multi-antenna receiving processor 472, the receiving processor 470, the controller/processor 475, or the memory 476 is used to receive a first signaling on a first time-frequency-resource block in the present disclosure.

In one embodiment, at least one of the antenna 420, the transmitter 418, the multi-antenna transmitting processor 471, the transmitting processor 416, the controller/processor 475, or the memory 476 is used to transmit a second signal on a second time-frequency-resource block in the present disclosure.

In one embodiment, at least one of the antenna 420, the transmitter 418, the multi-antenna transmitting processor 471, the transmitting processor 416, the controller/processor 475, or the memory 476 is used to drop transmission of a second signal on a second time-frequency-resource block in the present disclosure.

In one embodiment, at least one of the antenna 420, the receiver 418, the multi-antenna receiving processor 472, the receiving processor 470, the controller/processor 475, or the memory 476 is used to receive fourth information in the present disclosure.

Embodiment 5

Figure 5:
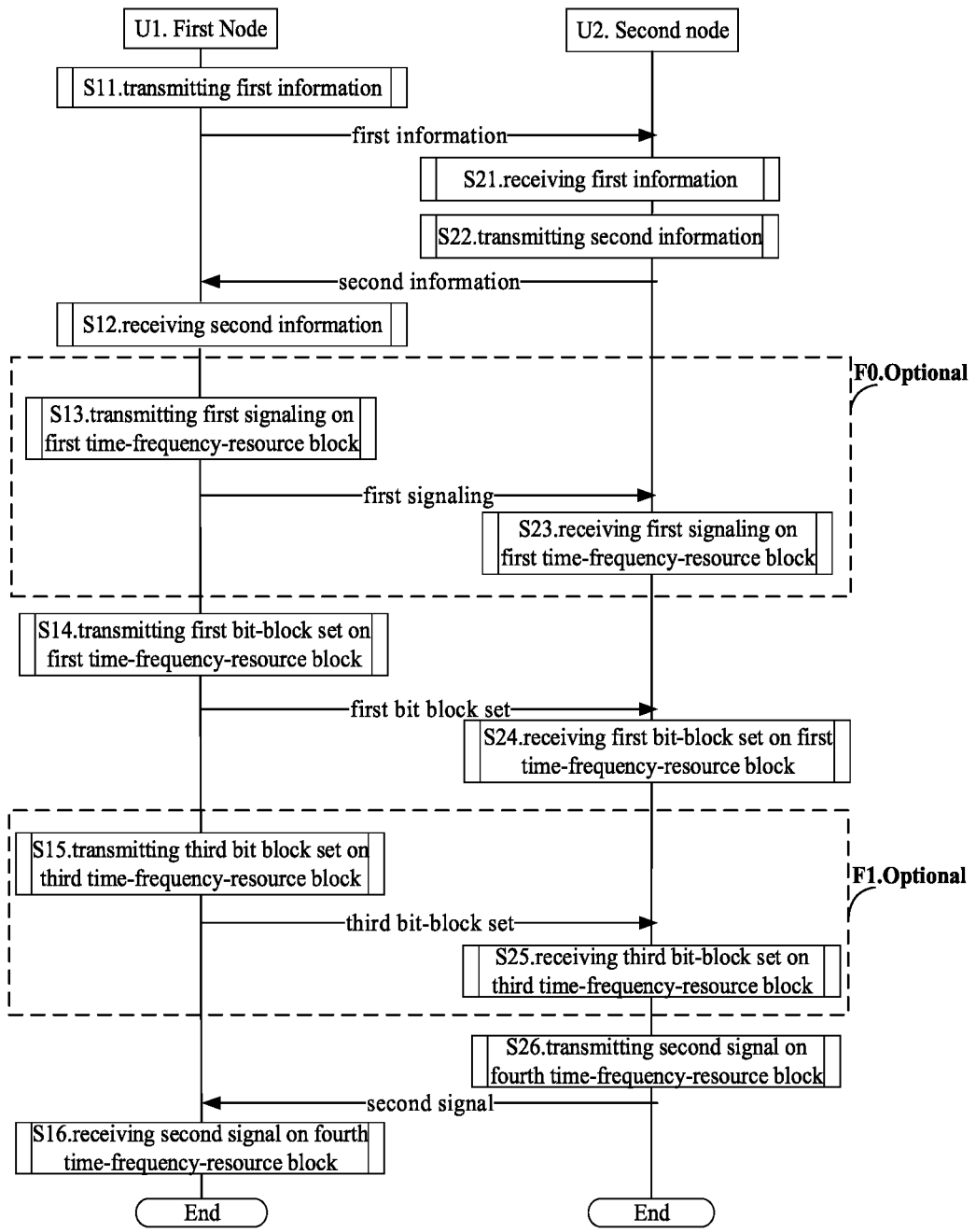
FIG. 5 illustrates a flowchart of a radio signal transmission according to one embodiment of the present disclosure.

Embodiment 5 illustrates a flowchart of radio signal transmission according to one embodiment in the present disclosure, as shown in FIG. 5. In FIG. 5, a first node U1 and a second node U2 are in communication via an air interface. In FIG. 5, steps in dotted block F0 and in dotted block F1 are respectively optional.

The first node U1 transmits first information in step S11; receives second information in step S12; transmits a first signaling in a first time-frequency-resource block in step S13; transmits a first bit-block set on a first time-frequencyresource block in step S14; transmits a third bit-block set on a third time-frequency-resource block in step S15; and receives a second signal on a fourth time-frequency-resource block.

The second node U2 receives first information in step S21; transmits second information in step S22; receives a first signaling on a first time-frequency-resource block in step S23; receives a first bit-block set on a first time-frequency-resource block in step S24; receives a third bit-block set on a third time-frequency-resource block in step S25; and transmits a second signal on a fourth time-frequency-resource block in step S26.

In Embodiment 5, the first information is used for indicating Q first-type time-frequency-resource blocks, Q being a positive integer greater than 1; the first time-frequency-resource block and the third time-frequency-resource block are two of the Q first-type time-frequency-resource blocks respectively; the first information is used for indicating that the fourth time-frequency-resource block is associated with the third time-frequency-resource block; the second information indicates that the fourth time-frequency-resource block is associated with the first time-frequency-resource block; the second signal is used for indicating whether a target bit-block set is correctly received; when the first node U1 transmits the third bit-block set on the third time-frequency-resource block, the target bit-block set is the third bit-block set, otherwise the target bit-block set is the first bit-block set; the first signaling is used for scheduling the first bit-block set; the first signaling comprises third information, the third information being used for indicating the third time-frequency-resource block; and the first information is used for indicating that a second time-frequency-resource block is associated with the first time-frequency-resource block; the second information is used for determining that the second time-frequency-resource block cannot be used by the second node U2 to transmit the second signal.

In one embodiment, when the second information is correctly received, the second signal is monitored on the fourth time-frequency-resource block.

In one embodiment, when the second information is correctly received, the second signal is received on the fourth time-frequency-resource block.

In one embodiment, when the second information is not correctly received, the second signal is monitored on the second time-frequency-resource block.

In one embodiment, when the second information is not correctly received, the second signal is received on the second time-frequency-resource block.

In one embodiment, the second information is used for determining that the second time-frequency-resource block cannot be used by the second node U2 to transmit the second signal.

In one embodiment, the second information is used for indicating the fourth time-frequency-resource block.

In one embodiment, steps in box F0 in FIG. 5 exist.
In one embodiment, steps in box F0 in FIG. 5 do not exist.
In one embodiment, steps in box F1 in FIG. 5 exist.
In one embodiment, steps in box F1 in FIG. 5 do not exist.
In one embodiment, when steps in box F1 in FIG. 5 exist, the target bit-block set is the third bit-block set.
In one embodiment, when steps in box F1 in FIG. 5 do not exist, the target bit-block set is the first bit-block set.
In one embodiment, the second signal is a baseband signal.
In one embodiment, the second signal is a radio signal.
In one embodiment, the second signal is Broadcast.
In one embodiment, the second signal is Groupcast.
In one embodiment, the second signal is Unicast.
In one embodiment, the second signal is Cell-specific.
In one embodiment, the second signal is UE-specific.
In one embodiment, the second signal comprises feedback for the target bit-block set.
In one embodiment, the feedback for the target bit-block set is used for indicating whether the target bit-block set is correctly received.
In one embodiment, the feedback for the target bit-block set comprises channel quality experienced by the target bit-block set.
In one embodiment, the second signal comprises feedback for the first bit-block set.
In one embodiment, the feedback for the first bit-block set is used for indicating whether the first bit-block set is correctly received.
In one embodiment, the feedback for the first bit-block set comprises channel quality experienced by the first bit-block set.
In one embodiment, the second signal comprises feedback for the third bit-block set.
In one embodiment, the feedback for the third bit-block set is used for indicating whether the third bit-block set is correctly received.
In one embodiment, the feedback for the third bit-block set comprises channel quality experienced by the third bit-block set.
In one embodiment, the second signal comprises one of the feedback for the first bit-block set or the feedback for the third bit-block set.
In one embodiment, the second signal comprises the feedback for the first bit-block set and the feedback for the third bit-block set.
In one embodiment, the second signal is transmitted on a Physical Sidelink Feedback Channel (PSFCH).
In one embodiment, the second signal is transmitted on a PSCCH.
In one embodiment, the second signal is transmitted on a PSSCH.
In one embodiment, the second signal is transmitted on a PSCCH and a PSSCH.
In one embodiment, the second signal comprises an RS.
In one embodiment, the second signal does not comprise an RS.
In one embodiment, the second signal comprises a DMRS.
In one embodiment, the second signal does not comprise a DMRS.
In one embodiment, the second signal comprises a CSI-RS.
In one embodiment, the second signal does not comprise a CSI-RS.
In one embodiment, the second signal comprises an SL DMRS.
In one embodiment, the second signal comprises a PSSCH DMRS.
In one embodiment, the second signal comprises a PSCCH DMRS.
In one embodiment, the second signal comprises an SL CSI-RS.
In one embodiment, the second signal is used for determining whether the target bit-block set is correctly received.
In one embodiment, the second signal is used for indicating whether the target bit-block set is correctly received.
In one embodiment, the second signal is used for indicating that the target bit-block set is correctly received.

In one embodiment, the second signal is used for indicating that the target bit-block set is not correctly received.

In one embodiment, the second signal is used for indicating whether the first bit-block set is correctly received.

In one embodiment, the second signal is used for indicating that the first bit-block set is correctly received.

In one embodiment, the second signal is used for indicating that the first bit-block set is not correctly received.

In one embodiment, the second signal is used for indicating whether the third bit-block set is correctly received.

In one embodiment, the second signal is used for indicating that the third bit-block set is correctly received.

In one embodiment, the second signal is used for indicating that the third bit-block set is not correctly received.

In one embodiment, only when the target bit-block set is correctly received, the second signal is transmitted.

In one embodiment, only when the target bit-block set is not correctly received, the second signal is transmitted.

In one embodiment, the second signal is used for indicating whether any of the positive integer number of first-type target bit block(s) comprised in the target bit-block set is correctly received.

In one embodiment, the second signal is used for indicating that any of the positive integer number of first-type target bit block(s) comprised in the target bit-block set is correctly received.

In one embodiment, the second signal is used for indicating that all of the positive integer number of first-type target bit block(s) comprised in the target bit-block set is(are) correctly received.

In one embodiment, the second signal is used for indicating that any of the positive integer number of first-type target bit block(s) comprised in the target bit-block set is not correctly received.

In one embodiment, the second signal is used for indicating that all of the positive integer number of first-type target bit block(s) comprised in the target bit-block set is(are) not correctly received.

In one embodiment, the second signal is used for indicating whether at least one of the positive integer number of first-type target bit block(s) comprised in the target bit-block set is correctly received.

In one embodiment, the second signal is used for indicating that at least one of the positive integer number of first-type target bit block(s) comprised in the target bit-block set is correctly received.

In one embodiment, the second signal is used for indicating that at least one of the positive integer number of first-type target bit block(s) comprised in the target bit-block set is not correctly received.

In one embodiment, the second signal comprises Sidelink Feedback Information (SFI).

In one embodiment, the second signal comprises Hybrid Automatic Repeat Request (HARQ).

In one embodiment, the second signal comprises Hybrid Automatic Repeat request-Acknowledge (HARQ-ACK).

In one embodiment, the second signal comprises Hybrid Automatic Repeat request-Negative Acknowledge (HARQ-NACK).

In one embodiment, the second signal comprises one of HARQ-ACK or HARQ-NACK.

In one embodiment, the second signal comprises a HARQ Codebook.

In one embodiment, the second signal comprises a first sequence.

In one embodiment, the first sequence is generated by a pseudo-random sequence.

In one embodiment, the first sequence is generated by a Gold sequence.

In one embodiment, the first sequence is generated by a M sequence.

In one embodiment, the first sequence is generated by a Zadeoff-Chu sequence.

In one embodiment, the generation method of the first sequence refers to 3GPP TS38. 211, chapter 7.4.1.5.

In one embodiment, the first sequence is used for indicating HARQ-ACK.

In one embodiment, the first sequence is used for indicating that the target bit-block set is correctly received.

In one embodiment, the first sequence is used for indicating that any of the positive integer number of first-type target bit block(s) comprised in the target bit-block set is correctly received.

In one embodiment, the first sequence is used for indicating that at least one of the positive integer number of first-type target bit block(s) comprised in the target bit-block set is correctly received.

In one embodiment, the second signal comprises a second sequence.

In one embodiment, the second sequence is generated by a pseudo-random sequence.

In one embodiment, the second sequence is generated by a Gold sequence.

In one embodiment, the second sequence is generated by a M sequence.

In one embodiment, the second sequence is generated by a Zadeoff-Chu sequence.

In one embodiment, the generation method of the second sequence refers to 3GPP TS38. 211, chapter 7.4.1.5.

In one embodiment, the second sequence is used for indicating HARQ-ACK.

In one embodiment, the second sequence is used for indicating that the target bit-block set is not correctly received.

In one embodiment, the second sequence is used for indicating that any of the positive integer number of first-type target bit block(s) comprised in the target bit-block set is not correctly received.

In one embodiment, the second sequence is used for indicating that at least one of the positive integer number of first-type target bit block(s) comprised in the target bit-block set is not correctly received.

In one embodiment, the second signal comprises a positive integer number of bit(s), the positive integer number of bit(s) in the second signal is(are) respectively used for indicating whether the positive integer number of first-type target bit block(s) in the target bit-block set is(are) correctly received.

In one embodiment, the second signal comprises a positive integer number of bit(s), the positive integer number of bit(s) in the second signal is(are) respectively used for indicating that the positive integer number of first-type target bit block(s) in the target bit-block set is(are) correctly received.

In one embodiment, the second signal comprises a positive integer number of bit(s), the positive integer number of bit(s) in the second signal is(are) respectively used for indicating that the positive integer number of first-type target bit block(s) in the target bit-block set is(are) not correctly received.

In one embodiment, a first bit is any bit in the second signal, a first target bit block is a first-type target bit block in the target bit-block set, and the first bit is used for indicating whether the first target bit block is correctly received.

In one embodiment, a first bit is any bit in the second signal, a first target bit block is a first-type target bit block in the target bit-block set, and the first bit is used for indicating that the first target bit block is correctly received.

In one embodiment, a first bit is any bit in the second signal, a first target bit block is a first-type target bit block in the target bit-block set, and the first bit is used for indicating that the first target bit block is not correctly received.

In one embodiment, the second signal comprises a second bit, the second signal being used for indicating that all first-type target bit blocks in the target bit-block set are correctly received.

In one embodiment, the second signal comprises a second bit, the second bit is used for indicating that at least one of first-type target bit block in the target bit-block set is not correctly received.

In one embodiment, the positive integer number of bit(s) in the second signal respectively indicate(s) HARQ information.

In one embodiment, the positive integer number of bit(s) in the second signal is(are) binary bit(s) respectively.

In one embodiment, the first bit indicates HARQ information.

In one embodiment, the first bit indicates HARQ-NACK information.

In one embodiment, the second bit indicates HARQ information.

In one embodiment, the second bit indicates HARQ-NACK information.

In one embodiment, the second signal comprises HARQ-ACK.

In one embodiment, the second signal comprises SL HARQ-NACK.

In one embodiment, the second signal is HARQ-ACK.

In one embodiment, a value of the first bit is "0".

In one embodiment, a value of the first bit is "1".

In one embodiment, a value of the first bit is a Boolean value "TRUE".

In one embodiment, a value of the first bit is a Boolean value "FALSE".

In one embodiment, a value of the second bit is "0".

In one embodiment, a value of the second bit is "1".

In one embodiment, a value of the second bit is a Boolean value "TRUE".

In one embodiment, a value of the second bit is a Boolean value "FALSE".

In one embodiment, when the first target bit block in the target bit-block set is correctly received, the second signal is transmitted, the second signal comprising the first bit, a value of the first bit being "1".

In one embodiment, when the first target bit block in the target bit-block set is correctly received, the second signal is transmitted, the second signal comprising the first bit, a value of the first bit being a Boolean value "TRUE".

In one embodiment, when the first target bit block in the target bit-block set is not correctly received, the second signal is transmitted, the second signal comprising the first bit, a value of the first bit being "0".

In one embodiment, when the first target bit block in the target bit-block set is not correctly received, the second signal is transmitted, the second signal comprising the first bit, a value of the first bit being a Boolean value "FALSE".

In one embodiment, when all first-type target bit block(s) in the target bit-block set is(are) not correctly received, the second signal is transmitted, the second signal comprising the second sequence.

In one embodiment, when all first-type target bit block(s) in the target bit-block set is(are) correctly received, the second signal is transmitted, the second signal comprising the first sequence.

In one embodiment, when at least one first-type target bit block in the target bit-block set is not correctly received, transmission of the second signal is dropped.

In one embodiment, when all first-type target bit block in the target bit-block set is(are) correctly received, the second signal is transmitted; when at least one first-type target bit block in the target bit-block set is not correctly received, transmission of the second signal is dropped.

In one embodiment, when all first-type target bit blocks in the target bit-block set are correctly received, transmission of the second signal is dropped; when at least one first-type target bit block in the target bit-block set is not correctly received, the second signal is transmitted.

In one embodiment, the phrase that the target bit-block set is correctly received comprises: a result of channel decoding performed on the target bit-block set passes CRC check.

In one embodiment, the phrase that the target bit-block set is correctly received comprises: a result of receiving power detection performed on the target bit-block set is higher than a given receiving power threshold.

In one embodiment, the phrase that the target bit-block set is correctly received comprises: an average value of multiple receiving power detections performed on the target bit-block set is higher than a given receiving power threshold.

In one embodiment, the phrase that a first-type target bit block in the target bit-block set is correctly received comprises: a result of channel decoding performed on one first-type target bit block in the target bit-block set passes CRC check.

In one embodiment, the phrase that a first-type target bit block in the target bit-block set is correctly received comprises: a result of receiving power detection performed on one first-type target bit block in the target bit-block set is higher than a given receiving power threshold.

In one embodiment, the phrase that a first-type target bit block in the target bit-block set is correctly received comprises: an average value of multiple receiving power detections performed on one first-type target bit block in the target bit-block set is higher than a given receiving power threshold.

In one embodiment, the second signal comprises channel quality experienced by the target bit-block set.

In one embodiment, channel quality experienced by the target bit-block set is measured by dBm.

In one embodiment, channel quality experienced by the target bit-block set is measured by dB.

In one embodiment, channel quality experienced by the target bit-block set is measured by W.

In one embodiment, channel quality experienced by the target bit-block set is measured by mW.

In one embodiment, channel quality experienced by the target bit-block set comprises Channel-State Information (CSI).

In one embodiment, channel quality experienced by the target bit-block set comprises SL CSI.

In one embodiment, channel quality experienced by the target bit-block set comprises receiving power of the target bit-block set.

In one embodiment, channel quality experienced by the target bit-block set comprises total receiving power of the target bit-block set.

In one embodiment, channel quality experienced by the target bit-block set comprises average receiving power of the target bit-block set.

In one embodiment, channel quality experienced by the target bit-block set comprises a linear average value of receiving power in the target bit-block set in time domain.

In one embodiment, channel quality experienced by the target bit-block set comprises a linear average value of receiving power in the target bit-block set in frequency domain.

In one embodiment, channel quality experienced by the target bit-block set comprises a linear average value of receiving power of the positive integer number of first-type target bit block(s).

In one embodiment, channel quality experienced by the target bit-block set comprises average receiving power of an RS used for transmitting the target bit-block set.

In one embodiment, channel quality experienced by the target bit-block set comprises a linear average value of receiving power of an RS in time domain used for transmitting the target bit-block set.

In one embodiment, channel quality experienced by the target bit-block set comprises a linear average value of receiving power of an RS in frequency domain used for transmitting the target bit-block set.

In one embodiment, channel quality experienced by the target bit-block set comprises Reference Signal Receiving Power (RSRP).

In one embodiment, channel quality experienced by the target bit-block set comprises a Received Signal Strength Indication (RSSI).

In one embodiment, channel quality experienced by the target bit-block set comprises Reference Signal Receiving Quality (RSRQ).

In one embodiment, channel quality experienced by the target bit-block set comprises a Signal to Noise Ratio (SNR).

In one embodiment, channel quality experienced by the target bit-block set comprises a Signal to Interference plus Noise Ratio (SINR).

In one embodiment, channel quality experienced by the target bit-block set comprises L1-RSRP.

In one embodiment, channel quality experienced by the target bit-block set comprises L3-RSRP.

In one embodiment, channel quality experienced by the target bit-block set comprises SL-RSRP.

In one embodiment, channel quality experienced by the target bit-block set comprises PS SCH-RSRP.

In one embodiment, channel quality experienced by the target bit-block set comprises PSCCH-RSRP.

In one embodiment, the first signaling is used for scheduling the first bit-block set.

In one embodiment, the first signaling is used for indicating the first time-frequency-resource block.

In one embodiment, the first signaling is used for indicating a Modulation and Coding Scheme (MCS) used by the first bit-block set.

In one embodiment, the first signaling is used for indicating a DMRS used by the first bit-block set.

In one embodiment, the first signaling is used for indicating transmitting power used by the first bit-block set.

In one embodiment, the first signaling is used for indicating an RV used by the first bit-block set.

In one embodiment, the first signaling comprises one or more fields in SCI.

In one embodiment, the first signaling is SCI.

In one embodiment, the first signaling comprises one or more fields in a Configured Grant.

In one embodiment, the first signaling is the Configured Grant.

In one embodiment, the definition of the Configured Grant refers to 3GPP TS38.214, chapter 6.1.2.3.

In one embodiment, the first signaling comprises a priority.

In one embodiment, the first signaling comprises the third information.

In one embodiment, the third information comprises a priority.

In one embodiment, the third information comprises a priority of the first bit-block set.

In one embodiment, the third information comprises a priority of the third bit-block set.

In one embodiment, the third information comprises transmitting power.

In one embodiment, the third information comprises transmitting power of the first bit-block set.

In one embodiment, the third information comprises transmitting power of the third bit-block set.

In one embodiment, the third information comprises a Payload.

In one embodiment, the third information comprises a Payload of the first bit-block set.

In one embodiment, the third information comprises a Payload of the third bit-block set.

Embodiment 6

Figure 6:
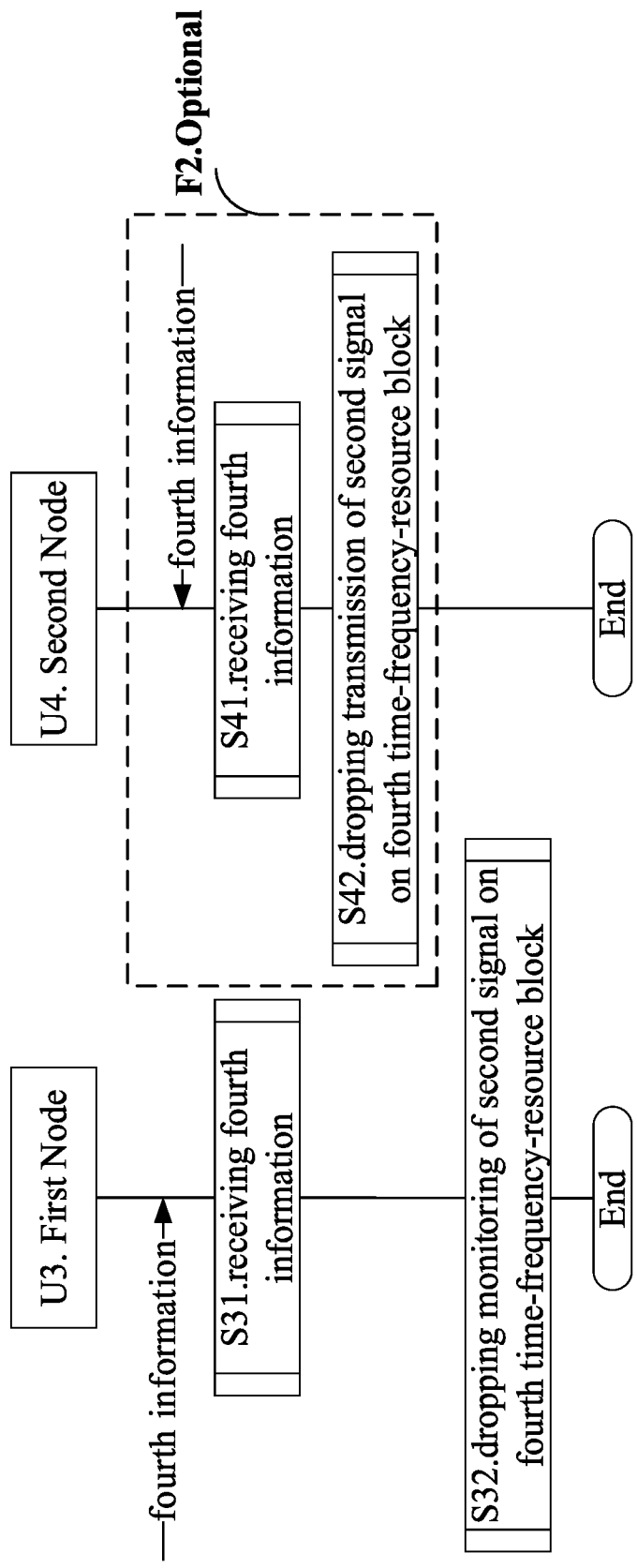
FIG. 6 illustrates a flowchart of a radio signal transmission according to one embodiment of the present disclosure.

Embodiment 6 illustrates a flowchart of radio signal transmission according to one embodiment of the present disclosure, as shown in FIG. 6. In FIG. 6, a first node U3 and a second node U4 are in communication via an air interface. In FIG. 6, steps in dotted block F2 are optional.

The first node U3 receives fourth information in step S31; drops monitoring of a second signal on a fourth time-frequency-resource block in step S32.

The second node U4 receives fourth information in step S41; drops transmission of a second signal on a fourth time-frequency-resource block in step S42.

In Embodiment 6, the fourth information is used for indicating that the fourth time-frequency-resource block cannot be used by the second node U4 for transmitting the second signal.

In one embodiment, steps in block F2 in FIG. 6 exist.

In one embodiment, steps in block F2 in FIG. 6 do not exist.

In one embodiment, when a target receiver of the fourth information is the second node U4, steps in block F2 in FIG. 6 exist.

In one embodiment, when a target receiver of the fourth information does not comprise the second node U4, steps in block F2 in FIG. 6 do not exist.

In one embodiment, when the fourth information is unicast transmitted and a target receiver of the fourth information is the first node U3, steps in block F2 in FIG. 6 do not exist.

In one embodiment, when the fourth information is groupcast transmitted, and a target receiver of the fourth information comprises the second node U4, steps in block F2 in FIG. 6 exist.

In one embodiment, the fourth information is Broadcast.

In one embodiment, the fourth information is Groupcast.

In one embodiment, the fourth information is Unicast.

In one embodiment, the fourth information is Cell-specific.

In one embodiment, the fourth information is UE-specific.

In one embodiment, the fourth information is transmitted through a DL-SCH.

In one embodiment, the fourth information is transmitted through a PDCCH.

In one embodiment, the fourth information is transmitted through a PDSCH.

In one embodiment, the fourth information is transmitted through a PDCCH and a PDSCH.

In one embodiment, the fourth information is transmitted through a SL-SCH.

In one embodiment, the fourth information is transmitted through a PSCCH.

In one embodiment, the fourth information is transmitted through a PSSCH.

In one embodiment, the fourth information is transmitted through a PSCCH and a PSSCH.

In one embodiment, the fourth information comprises all or part of a higher-layer signaling.

In one embodiment, the fourth information comprises all or part of an RRC signaling.

In one embodiment, the fourth information comprises one or more fields of an RRC IE.

In one embodiment, the fourth information comprises all or part of a MAC layer signaling.

In one embodiment, the fourth information comprises one or more fields of a MAC CE.

In one embodiment, the fourth information comprises one or more fields of a PHY layer signaling.

In one embodiment, the fourth information comprises one or more fields of DCI.

In one embodiment, the fourth information comprises one or more fields of SCI.

In one embodiment, the fourth information is semi-statically configured.

In one embodiment, the fourth information is dynamically configured.

In one embodiment, the fourth information is used for indicating that the fourth time-frequency-resource block is reserved.

In one embodiment, the fourth information is used for indicating that the fourth time-frequency-resource block cannot be used for SL transmission.

In one embodiment, the fourth information is used for indicating that the fourth time-frequency-resource block does not belong to a V2X resource pool.

In one embodiment, the fourth information is used for indicating that the fourth time-frequency-resource block cannot be used by the second node U4 for transmitting a radio signal.

In one embodiment, the fourth information is used for indicating that the fourth time-frequency-resource block cannot be used by the second node U4 for transmitting the second signal.

In one embodiment, the fourth information is used for indicating that the fourth time-frequency-resource block cannot be used by the first node U3 for SL transmission.

In one embodiment, the fourth information is used for indicating that the fourth time-frequency-resource block cannot used by the first node U3 for receiving the second signal.

In one embodiment, when the first node U3 receives the fourth information, the first node U3 drops reception of the second signal on the fourth time-frequency-resource block.

In one embodiment, when the fourth information is correctly received by the first node U3, the first node U3 drops monitoring of the second signal on the fourth time-frequency-resource block.

In one embodiment, when the fourth information is correctly received by the first node U3, the first node U3 drops reception of the second signal on the fourth time-frequency-resource block.

In one embodiment, when the second node U4 receives the fourth information, the second node U4 drops transmission of the second signal on the fourth time-frequency-resource block.

In one embodiment, when the fourth information is correctly received by the second node U4, the second node U4 drops transmission of the second signal on the fourth time-frequency-resource block.

In one embodiment, the fourth information is used for indicating a fourth time-frequency-resource block, and the third air-interface-resource block is associated with the fourth air-interface-resource block.

In one embodiment, the fourth information comprise a priority.

In one embodiment, the fourth information comprises a time-domain-resource unit occupied by the fourth time-frequency-resource block.

In one embodiment, the fourth information comprises a frequency-domain-resource unit occupied by the fourth time-frequency-resource block.

In one embodiment, the fourth information comprises a time-frequency-resource unit occupied by the fourth time-frequency-resource block.

In one embodiment, a transmitter of the fourth information and a transmitter of the second information are Non-Co-Located.

In one embodiment, a transmitter of the fourth information and a transmitter of the second information are respectively two different communication nodes.

In one embodiment, a transmitter of the fourth information is a base station, and a transmitter of the second information is a UE.

In one embodiment, a transmitter of the fourth information is a relay, and a transmitter of the second information is a UE.

In one embodiment, a transmitter of the fourth information is a base station, and a transmitter of the second information is a relay.

In one embodiment, a transmitter of the fourth information and a transmitter of the second information are respectively two different UEs.

In one embodiment, a Backhaul Link between a transmitter of the fourth information and a transmitter of the second information is non-ideal (that is, a delay cannot be ignored).

In one embodiment, a transmitter of the fourth information and a transmitter of the second information do not share a same set of BaseBand apparatus.

Embodiment 7

Figure 7:
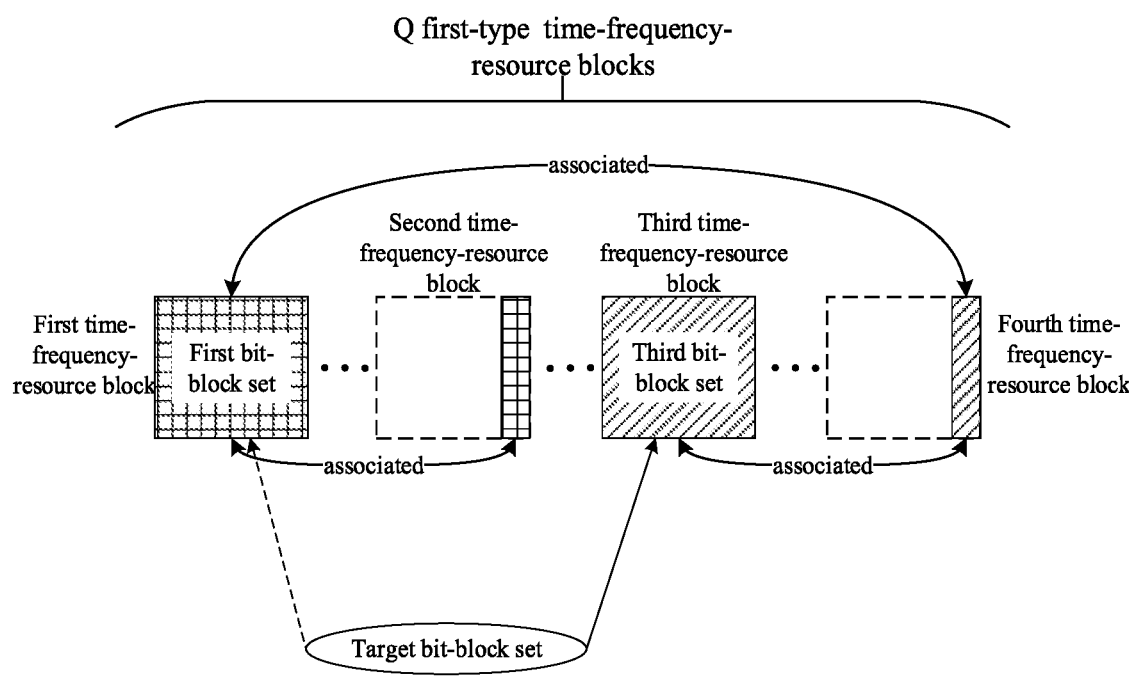
FIG. 7 illustrates a schematic diagram of relationships among a first time-frequency-resource block, a second time-frequency-resource block, a third time-frequency-resource block and a fourth resource block according to one embodiment of the present disclosure.

Embodiment 7 illustrates a schematic diagram of relationships among a first time-frequency-resource block, a second time-frequency-resource block, a third time-frequency-resource block and a fourth resource block according to one embodiment of the present disclosure, as shown in FIG. 7. In FIG. 7, the large solid box filled with small squares represents a first time-frequency-resource block in the present disclosure; the large dotted box where the rectangle filled with the small squares is located represents a second time-frequency-resource block in the present disclosure; the large solid box filled with slashes represents a third time-frequency-resource block in the present disclosure; the large dotted box where the rectangle filled with the slashes is located represents a fourth time-frequency-resource block in the present disclosure; the ellipse represents a target bit-block set in the present disclosure.

In Embodiment 7, the first time-frequency-resource block, the second time-frequency-resource block, the third time-frequency-resource block and the fourth time-frequency-resource block are respectively four first-type time-frequency-resource blocks among Q first-type time-frequency-resource blocks, Q being a positive integer greater than 1; the second time-frequency-resource block is associated with the first time-frequency-resource block; the fourth time-frequency-resource block is associated with the third time-frequency-resource block; the fourth time-frequency-resource block is associated with the first time-frequency-resource block; the second information is used for indicating that the second time-frequency-resource block cannot be used by a transmitter of the second information for transmitting the second signal.

In one embodiment, the Q first-type time-frequency-resource blocks comprise the first time-frequency-resource block.

In one embodiment, the first time-frequency-resource block is one of the Q first-type time-frequency-resource blocks.

In one embodiment, the first time-frequency-resource block is used for transmitting the first bit-block set.

In one embodiment, the first time-frequency-resource block comprises a PSCCH.

In one embodiment, the first time-frequency-resource block comprises a PSSCH.

In one embodiment, the first time-frequency-resource block comprises a PSCCH and a PSSCH.

In one embodiment, the Q first-type time-frequency-resource blocks comprise the second time-frequency-resource block.

In one embodiment, the second time-frequency-resource block is one of the Q first-type time-frequency-resource blocks.

In one embodiment, the second time-frequency-resource block is used for transferring the second signal.

In one embodiment, the second time-frequency-resource block is used for transmitting the second signal.

In one embodiment, the second time-frequency-resource block is used for monitoring the second signal.

In one embodiment, the second time-frequency-resource block is used for receiving the second signal.

In one embodiment, the second time-frequency-resource block is used for transmitting the feedback for the first bit-block set.

In one embodiment, the second time-frequency-resource block is used for receiving the feedback for the first bit-block set.

In one embodiment, the second time-frequency-resource block is used for transferring the feedback for the first bit-block set.

In one embodiment, the first node monitors a second signal on the second time-frequency-resource block.

In one embodiment, the first node assumes that the second signal is transmitted on the second time-frequency-resource block.

In one embodiment, the first node assumes that the second signal is transmitted on at least one of the positive integer number of time-domain-resource unit(s) comprised in the second time-frequency-resource block.

In one embodiment, the first node monitors the second signal on at least one of the positive integer number of time-domain-resource unit(s) comprised in the second time-frequency-resource block.

In one embodiment, the first node assumes that the second signal is transmitted on at least one of the positive integer number of frequency-domain-resource unit(s) comprised in the second time-frequency-resource block.

In one embodiment, the first node monitors the second signal on at least one of the positive integer number of frequency-domain-resource unit(s) comprised in the second time-frequency-resource block.

In one embodiment, the first node assumes that the second signal is transmitted on at least one of the positive integer number of time-frequency-resource unit(s) comprised in the second time-frequency-resource block.

In one embodiment, the first node monitors the second signal on at least one of the positive integer number of time-frequency-resource unit(s) comprised in the second time-frequency-resource block.

In one embodiment, the second time-frequency-resource block comprises a PSFCH.

In one embodiment, at least one time-domain-resource unit among the positive integer number of time-domain-resource unit(s) comprised in the second time-frequency-resource block is occupied by a PSFCH.

In one embodiment, at least one time-frequency-resource unit among the positive integer number of time-frequency-resource unit(s) comprised in the second time-frequency-resource block is occupied by a PSFCH.

In one embodiment, one time-domain-resource unit among the positive integer number of time-domain-resource unit(s) comprised in the second time-frequency-resource block is occupied by a PSFCH.

In one embodiment, two time-domain-resource units among the positive integer number of time-domain-resource units comprised in the second time-frequency-resource block are occupied by a PSFCH.

In one embodiment, the phrase that the first node monitors the second signal on the second time-frequency-resource block refers to a reception based on a blind detection, that is, the first node receives a signal on the second time-frequency-resource block and performs decoding; if the decoding is determined to be correct according to a CRC bit, it is determined that the second signal is successfully received on the second time-frequency-resource block; otherwise, it is determined that the second signal is not successfully detected on the second time-frequency-resource block.

In one embodiment, the phrase that the first node monitors the second signal on the second time-frequency-resource block refers to a reception based on a coherent detection, that is, the first node performs a coherent reception of a radio signal with an RS sequence corresponding to a DMRS of the second signal on the second time-frequency-resource block, and measures energy of a signal obtained after the coherent reception; if the energy of the signal obtained after the coherent reception is greater than a first given threshold, it is determined that the second signal is successfully received on the second time-frequency-resource block; otherwise, it is determined that the second signal is not successfully detected on the second time-frequency-resource block.

In one embodiment, the phrase that the first node monitors the second signal on the second time-frequency-resource block refers to a reception based on energy detection, that is, the first node senses energy of a radio signal on the second time-frequency-resource block, and average it in time to obtain received energy; if the received energy is greater than a second given threshold, it is determined that the second signal is successfully received on the second time-frequency-resource block; otherwise, it is determined that the second signal is not successfully detected on the second time-frequency-resource block.

In one embodiment, the phrase that the second signal is detected refers to that after the second signal is received based on a blind detection, it is determined that decoding is correct according to a CRC bit.

In one embodiment, the Q first-type time-frequency-resource blocks comprise the third time-frequency-resource block.

In one embodiment, the third time-frequency-resource block is one of the Q first-type time-frequency-resource blocks.

In one embodiment, the third time-frequency-resource block is used for transmitting the third bit-block set.

In one embodiment, the third time-frequency-resource block comprises a PSCCH.

In one embodiment, the third time-frequency-resource block comprises a PSSCH.

In one embodiment, the third time-frequency-resource block comprises a PSCCH and a PSSCH.

In one embodiment, the Q first-type time-frequency-resource blocks comprise the fourth time-frequency-resource block.

In one embodiment, the fourth time-frequency-resource block is one of the Q first-type time-frequency-resource blocks.

In one embodiment, the fourth time-frequency-resource block is used for transferring the second signal.

In one embodiment, the fourth time-frequency-resource block is used for transmitting the second signal.

In one embodiment, the fourth time-frequency-resource block is used for monitoring the second signal.

In one embodiment, the fourth time-frequency-resource block is used for receiving the second signal.

In one embodiment, the fourth time-frequency-resource block is used for transmitting feedback for the third bit-block set.

In one embodiment, the fourth time-frequency-resource block is used for receiving feedback for the third bit-block set.

In one embodiment, the fourth time-frequency-resource block is used for transferring feedback for the third bit-block set.

In one embodiment, the first node monitors feedback for the third bit-block set on the fourth time-frequency-resource block.

In one embodiment, the first node assumes that feedback for the third bit-block set is transmitted on the fourth time-frequency-resource block.

In one embodiment, the fourth time-frequency-resource block is used for transmitting feedback for the first bit-block set.

In one embodiment, the fourth time-frequency-resource block is used for receiving feedback for the first bit-block set.

In one embodiment, the fourth time-frequency-resource block is used for transferring feedback for the first bit-block set.

In one embodiment, the first node monitors the second signal on the fourth time-frequency-resource block.

In one embodiment, the first node assumes that the second signal is transmitted on the fourth time-frequency-resource block.

In one embodiment, the first node assumes that the second signal is transmitted on at least one of the positive integer number of time-domain-resource unit(s) comprised in the fourth time-frequency-resource block.

In one embodiment, the first node monitors the second signal on at least one of the positive integer number of time-domain-resource unit(s) comprised in the fourth time-frequency-resource block.

In one embodiment, the first node assumes that the second signal is transmitted on at least one of the positive integer number of frequency-domain-resource unit(s) comprised in the fourth time-frequency-resource block.

In one embodiment, the first node monitors the second signal on at least one of the positive integer number of frequency-domain-resource unit(s) comprised in the fourth time-frequency-resource block.

In one embodiment, the first node assumes that the second signal is transmitted on at least one of the positive integer number of time-frequency-resource unit(s) comprised in the fourth time-frequency-resource block.

In one embodiment, the first node monitors the second signal on at least one of the positive integer number of time-frequency-resource unit(s) comprised in the fourth time-frequency-resource block.

In one embodiment, the fourth time-frequency-resource block comprises a PSFCH.

In one embodiment, a PSFCH occupies part of time-domain-resource unit(s) among the positive integer number of time-domain-resource unit(s) comprised in the fourth time-frequency-resource block.

In one embodiment, a PSFCH occupies part of the positive integer number of time-frequency-resource unit(s) comprised in the fourth time-frequency-resource block.

In one embodiment, a PSFCH occupies at least one time-domain-resource unit among the positive integer number of time-domain-resource unit(s) comprised in the fourth time-frequency-resource block.

In one embodiment, a PSFCH occupies at least one time-frequency-resource unit among the positive integer number of time-frequency-resource unit(s) comprised in the fourth time-frequency-resource block.

In one embodiment, a PSFCH occupies one time-domain-resource unit among the positive integer number of time-domain-resource unit(s) comprised in the fourth time-frequency-resource block.

In one embodiment, a PSFCH occupies two time-domain-resource units among the positive integer number of time-domain-resource units comprised in the fourth time-frequency-resource block.

In one embodiment, the phrase that the second time-frequency-resource block is associated with the first time-frequency-resource block refers to that a radio signal transferred on the second time-frequency-resource block is related to a radio signal transferred on the first time-frequency-resource block.

In one embodiment, the phrase that the second time-frequency-resource block is associated with the first time-frequency-resource block refers to that a radio signal received on the second time-frequency-resource block is related to a radio signal transmitted on the first time-frequency-resource block.

In one embodiment, the phrase that the second time-frequency-resource block is associated with the first time-frequency-resource block refers to that a radio signal transmitted on the second time-frequency-resource block is related to a radio signal received on the first time-frequency-resource block.

In one embodiment, the phrase that the second time-frequency-resource block is associated with the first time-frequency-resource block refers to that the first bit-block set is transferred on the first time-frequency-resource block, and feedback for the first bit-block set is transferred on the second time-frequency-resource block.

In one embodiment, the phrase that the second time-frequency-resource block is associated with the first time-frequency-resource block refers to that the first bit-block set is transferred on the first time-frequency-resource block, and feedback for the first bit-block set is transferred on the second time-frequency-resource block.

In one embodiment, the phrase that the second time-frequency-resource block is associated with the first time-frequency-resource block refers to that the first bit-block set is transmitted on the first time-frequency-resource block, and feedback for the first bit-block set is monitored on the second time-frequency-resource block.

In one embodiment, the phrase that the second time-frequency-resource block is associated with the first time-frequency-resource block refers to that the first bit-block set is transmitted on the first time-frequency-resource block, and feedback for the first bit-block set is received on the second time-frequency-resource block.

In one embodiment, the phrase that the second time-frequency-resource block is associated with the first time-frequency-resource block refers to that the first bit-block set is received on the first time-frequency-resource block, and feedback for the first bit-block set is transmitted on the second time-frequency-resource block.

In one embodiment, the second time-frequency-resource block is indicated by the first signaling, and the first signaling is transmitted on the first time-frequency-resource block.

In one embodiment, the first signaling indicates a time-domain-resource unit occupied by the second time-frequency-resource block in time domain.

In one embodiment, the first signaling indicates a frequency-domain-resource unit occupied by the second time-frequency-resource block in frequency domain.

In one embodiment, the first signaling indicates a time-frequency-resource unit occupied by the second time-frequency-resource block.

In one embodiment, the second time-frequency-resource block is not earlier than the first time-frequency-resource block.

In one embodiment, the second time-frequency-resource block is later than the first time-frequency-resource block.

In one embodiment, the first time-frequency-resource block is used for determining the second time-frequency-resource block.

In one embodiment, a time-domain-resource unit occupied by the first time-frequency-resource block in time domain is used for determining a time-domain-resource unit occupied by the second time-frequency-resource block in time domain.

In one embodiment, a frequency-domain-resource unit occupied by the first time-frequency-resource block in frequency domain is used for determining a frequency-domain-resource unit occupied by the second time-frequency-resource block in frequency domain.

In one embodiment, a time-frequency-resource unit occupied by the first time-frequency-resource block is used for determining a time-frequency-resource unit occupied by the second time-frequency-resource block.

In one embodiment, the second time-frequency-resource block and the first time-frequency-resource block are separated by a first time-domain offset in time domain.

In one embodiment, the first time-domain offset comprises a positive integer number of time-domain-resource unit(s).

In one embodiment, the first time-domain offset is predefined.

In one embodiment, the first time-domain offset is pre-configured.

In one embodiment, the first time-domain offset is configured.

In one embodiment, the first time-domain offset is fixed.

In one embodiment, the first time-domain offset is changeable.

In one embodiment, the first time-domain offset is a constant.

In one embodiment, the first time-domain offset is a variable.

In one embodiment, the first signaling indicates the first time-domain offset.

In one embodiment, the second time-frequency-resource block and the first time-frequency-resource block are separated by a first frequency-domain offset in frequency domain.

In one embodiment, the first frequency-domain offset comprises a positive integer number of frequency-domain-resource unit(s).

In one embodiment, the first frequency-domain offset is predefined.

In one embodiment, the first frequency-domain offset is pre-configured.

In one embodiment, the first frequency-domain offset is configured.

In one embodiment, the first frequency-domain offset is fixed.

In one embodiment, the first frequency-domain offset is changeable.

In one embodiment, the first frequency-domain offset is a constant.

In one embodiment, the first frequency-domain offset is a variable.

In one embodiment, the first signaling indicates the first frequency-domain offset.

In one embodiment, the phrase that the fourth time-frequency-resource block is associated with the third time-frequency-resource block refers to that a radio signal transferred on the fourth time-frequency-resource block is related to a radio signal transferred on the third time-frequency-resource block.

In one embodiment, the phrase that the fourth time-frequency-resource block is associated with the third time-frequency-resource block refers to that a radio signal received on the fourth time-frequency-resource block is related to a radio signal transmitted on the third time-frequency-resource block.

In one embodiment, the phrase that the fourth time-frequency-resource block is associated with the third time-frequency-resource block refers to that a radio signal transmitted on the fourth time-frequency-resource block is related to a radio signal received on the third time-frequency-resource block.

In one embodiment, the phrase that the fourth time-frequency-resource block is associated with the third time-frequency-resource block refers to that the third bit-block set is transferred on the third time-frequency-resource block, and feedback for the third bit-block set is transferred on the fourth time-frequency-resource block.

In one embodiment, the phrase that the fourth time-frequency-resource block is associated with the third time-frequency-resource block refers to that the third bit-block set is transferred on the third time-frequency-resource block, and feedback for the third bit-block set is transferred on the fourth time-frequency-resource block.

In one embodiment, the phrase that the fourth time-frequency-resource block is associated with the third time-frequency-resource block refers to that the third bit-block set is transmitted on the third time-frequency-resource block, and feedback for the third bit-block set is monitored on the fourth time-frequency-resource block.

In one embodiment, the phrase that the fourth time-frequency-resource block is associated with the third time-frequency-resource block refers to that the third bit-block set is transmitted on the third time-frequency-resource block, and feedback for the third bit-block set is received on the fourth time-frequency-resource block.

In one embodiment, the phrase that the fourth time-frequency-resource block is associated with the third time-frequency-resource block refers to that the third bit-block set is received on the third time-frequency-resource block, and feedback for the third bit-block set is transmitted on the fourth time-frequency-resource block.

In one embodiment, the fourth time-frequency-resource block is indicated by the second signaling, the second signaling being transmitted on the third time-frequency-resource block.

In one embodiment, the second signaling indicates a time-domain-resource unit occupied by the fourth time-frequency-resource block in time domain.

In one embodiment, the second signaling indicates a frequency-domain-resource unit occupied by the fourth time-frequency-resource block in frequency domain.

In one embodiment, the second signaling indicates a time-frequency-resource unit occupied by the fourth time-frequency-resource block.

In one embodiment, the second signaling is used for scheduling the third bit-block set.

In one embodiment, the second signaling is used for indicating the third time-frequency-resource block.

In one embodiment, the second signaling is used for indicating an MCS used by the third bit-block set.

In one embodiment, the fourth time-frequency-resource block is not earlier than the third time-frequency-resource block.

In one embodiment, the fourth time-frequency-resource block is later than the third time-frequency-resource block.

In one embodiment, the third time-frequency-resource block is used for determining the fourth time-frequency-resource block.

In one embodiment, a time-domain-resource unit occupied by the third time-frequency-resource block in time domain is used for determining a time-domain-resource unit occupied by the fourth time-frequency-resource block in time domain.

In one embodiment, a frequency-domain-resource unit occupied by the third time-frequency-resource block in frequency domain is used for determining a frequency-domain-resource unit occupied by the fourth time-frequency-resource block in frequency domain.

In one embodiment, a time-frequency-resource unit occupied by the third time-frequency-resource block is used for determining a time-frequency-resource unit occupied by the fourth time-frequency-resource block.

In one embodiment, the fourth time-frequency-resource block and the third time-frequency-resource block are separated by a second time-domain offset in time domain.

In one embodiment, the second time-domain offset comprises a positive integer number of time-domain-resource unit(s).

In one embodiment, the second time-domain offset is predefined.

In one embodiment, the second time-domain offset is pre-configured.

In one embodiment, the second time-domain offset is configured.

In one embodiment, the second time-domain offset is fixed.

In one embodiment, the second time-domain offset is changeable.

In one embodiment, the second time-domain offset is a constant.

In one embodiment, the second time-domain offset is a variable.

In one embodiment, the second signaling indicates the second time-domain offset.

In one embodiment, the fourth time-frequency-resource block and the third time-frequency-resource block are separated by a second frequency-domain offset in frequency domain.

In one embodiment, the second frequency-domain offset comprises a positive integer number of frequency-domain-resource unit(s).

In one embodiment, the second frequency-domain offset is predefined.

In one embodiment, the second frequency-domain offset is pre-configured.

In one embodiment, the second frequency-domain offset is configured.

In one embodiment, the second frequency-domain offset is fixed.

In one embodiment, the second frequency-domain offset is changeable.

In one embodiment, the second frequency-domain offset is a constant.

In one embodiment, the second frequency-domain offset is a variable.

In one embodiment, the second signaling indicates the second frequency-domain offset.

In one embodiment, the phrase that the fourth time-frequency-resource block is associated with the first time-frequency-resource block refers to that a radio signal transferred on the fourth time-frequency-resource block is related to a radio signal transferred on the first time-frequency-resource block.

In one embodiment, the phrase that the fourth time-frequency-resource block is associated with the first time-frequency-resource block refers to that a radio signal received on the fourth time-frequency-resource block is related to a radio signal transmitted on the first time-frequency-resource block.

In one embodiment, the phrase that the fourth time-frequency-resource block is associated with the first time-frequency-resource block refers to that a radio signal transmitted on the fourth time-frequency-resource block is related to a radio signal received on the first time-frequency-resource block.

In one embodiment, the phrase that the fourth time-frequency-resource block is associated with the first time-frequency-resource block refers to that the first time-frequency-resource block is used for transferred the first bit-block set, and the fourth time-frequency-resource block is used for transferring feedback for the first bit-block set.

In one embodiment, the phrase that the fourth time-frequency-resource block is associated with the first time-frequency-resource block refers to that first time-frequency-resource block is used for transmitting the first bit-block set, and feedback for the first bit-block set is monitored on the fourth time-frequency-resource block.

In one embodiment, the phrase that the fourth time-frequency-resource block is associated with the first time-frequency-resource block refers to that first time-frequency-resource block is used for transmitting the first bit-block set, and feedback for the first bit-block set is received on the fourth time-frequency-resource block.

In one embodiment, the phrase that the fourth time-frequency-resource block is associated with the first time-frequency-resource block refers to that the first bit-block set is received on the first time-frequency-resource block, and the fourth time-frequency-resource block is used for transmitting feedback for the first bit-block set.

In one embodiment, the phrase that the fourth time-frequency-resource block is associated with the first time-frequency-resource block refers to that the first time-frequency-resource block is used for transferring the first bit-block set, the third time-frequency-resource block is used for transferring the third bit-block set, and the fourth time-frequency-resource block is used for transferring feedback for the first bit-block set and feedback for the third bit-block set.

In one embodiment, the phrase that the fourth time-frequency-resource block is associated with the first time-frequency-resource block refers to that the first time-frequency-resource block is used for transmitting the first bit-block set, the third time-frequency-resource block is used for transmitting the third bit-block set, and feedback for the first bit-block set and feedback for the third bit-block set are monitored on the fourth time-frequency-resource block.

In one embodiment, the phrase that the fourth time-frequency-resource block is associated with the first time-frequency-resource block refers to that the first time-frequency-resource block is used for transmitting the first bit-block set, the third time-frequency-resource block is used for transmitting the third bit-block set, and feedback for the first bit-block set and feedback for the third bit-block set are received on the fourth time-frequency-resource block.

In one embodiment, the phrase that the fourth time-frequency-resource block is associated with the first time-frequency-resource block refers to that the first bit-block set is received on the first time-frequency-resource block, the third bit-block set is received on the third time-frequency-resource block, and the fourth time-frequency-resource block is used for transmitting feedback for the first bit-block set and feedback for the third bit-block set.

In one embodiment, the phrase that the fourth time-frequency-resource block is associated with the first time-frequency-resource block refers to that the first time-frequency-resource block is used for transferring the first bit-block set, the third time-frequency-resource block is used for transferring the third bit-block set, and the fourth time-frequency-resource block is used for transferring feedback for the first bit-block set or feedback for the third bit-block set.

In one embodiment, the phrase that the fourth time-frequency-resource block is associated with the first time-frequency-resource block refers to that the first time-frequency-resource block is used for transmitting the first bit-block set, the third time-frequency-resource block is used for transmitting the third bit-block set, and feedback for the first bit-block set or feedback for the third bit-block set is monitored on the fourth time-frequency-resource block.

In one embodiment, the phrase that the fourth time-frequency-resource block is associated with the first time-frequency-resource block refers to that the first time-frequency-resource block is used for transmitting the first bit-block set, the third time-frequency-resource block is used for transmitting the third bit-block set, and feedback for the first bit-block set or feedback for the third bit-block set are received on the fourth time-frequency-resource block.

In one embodiment, the phrase that the fourth time-frequency-resource block is associated with the first time-frequency-resource block refers to that the first bit-block set is received on the first time-frequency-resource block, the third bit-block set is received on the third time-frequency-resource block, and the fourth time-frequency-resource block is used for transmitting feedback for the first bit-block set or feedback for the third bit-block set.

In one embodiment, the fourth time-frequency and the second time-frequency-resource block are both predefined.

In one embodiment, the fourth time-frequency and the second time-frequency-resource block are both pre-configured.

In one embodiment, the fourth time-frequency and the second time-frequency-resource block are both configured.

In one embodiment, the phrase that the fourth time-frequency-resource block is associated with the first time-frequency-resource block refers to that the fourth time-frequency is a candidate for the second time-frequency-resource block.

In one embodiment, the phrase that the fourth time-frequency-resource block is associated with the first time-frequency-resource block refers to that the first time-frequency-resource block is used for transferring the first bit-block set; when the second time-frequency-resource block cannot be used for transferring a first-type signal, the fourth time-frequency-resource block is used for transferring feedback for the first bit-block set.

In one embodiment, the first-type signal is transferred on a PC5 interface.

In one embodiment, the first-type signal comprises a V2X signal.

In one embodiment, the first-type signal is transferred on a PSFCH.

In one embodiment, the first-type signal is transferred on a PSSCH.

In one embodiment, the first-type signal is transferred on a PSCCH.

In one embodiment, the first-type signal comprises feedback for the first bit-block set.

In one embodiment, the first-type signal comprises the second signal.

In one embodiment, the first-type signal comprises HARQ information.

In one embodiment, the first-type signal comprises SL HARQ information.

In one embodiment, the first-type signal comprises HARQ-ACK.

In one embodiment, the first-type signal comprises HARQ-NACK.

In one embodiment, the first-type signal comprises Sidelink Channel State Information (SL CSI).

In one embodiment, the first-type signal comprises a Sidelink Reference Signal (SL RS).

In one embodiment, the phrase that the fourth time-frequency-resource block is associated with the first timefrequency-resource block refers to that the first time-frequency-resource block is used for transferring the first bit-block set; when the second time-frequency-resource block cannot be used for transferring feedback for the first bit-block set, the fourth time-frequency-resource block is used for transferring feedback for the first bit-block set.

In one embodiment, the phrase that the fourth time-frequency-resource block is associated with the first time-frequency-resource block refers to that the first time-frequency-resource block is used for transferring the first bit-block set; when the second time-frequency-resource block can be used for transferring feedback for the first bit-block set, the second time-frequency-resource block is used for transferring feedback for the first bit-block set.

In one embodiment, the phrase that the fourth time-frequency-resource block is associated with the first time-frequency-resource block refers to that the first time-frequency-resource block is used for transferring the first bit-block set; when the second information is transmitted, the fourth time-frequency-resource block is used for transferring feedback for the first bit-block set.

In one embodiment, the phrase that the fourth time-frequency-resource block is associated with the first time-frequency-resource block refers to that the first time-frequency-resource block is used for transferring the first bit-block set; when transmission of the second information is dropped, the second time-frequency-resource block is used for transferring feedback for the first bit-block set.

In one embodiment, the phrase that the fourth time-frequency-resource block is associated with the first time-frequency-resource block refers to that the first time-frequency-resource block is used for transferring the first bit-block set; when the second information is correctly received, feedback for the first bit-block set is monitored on the fourth time-frequency-resource block.

In one embodiment, the phrase that the fourth time-frequency-resource block is associated with the first time-frequency-resource block refers to that the first time-frequency-resource block is used for transferring the first bit-block set; when the second information is not correctly received, feedback for the first bit-block set is monitored on the second time-frequency-resource block.

In one embodiment, the fourth time-frequency-resource block and the first time-frequency-resource block are separated by a third time-domain offset in time domain.

In one embodiment, the third time-domain offset comprises a positive integer number of time-domain-resource unit(s).

In one embodiment, the third time-domain offset is predefined.

In one embodiment, the third time-domain offset is pre-configured.

In one embodiment, the third time-domain offset is configured.

In one embodiment, the third time-domain offset is fixed.

In one embodiment, the third time-domain offset is changeable.

In one embodiment, the third time-domain offset is a constant.

In one embodiment, the third time-domain offset is a variable.

In one embodiment, the fourth time-frequency-resource block and the first time-frequency-resource block are separated by a third frequency-domain offset in frequency domain.

In one embodiment, the third frequency-domain offset comprises a positive integer number of frequency-domain-resource unit(s).

In one embodiment, the third frequency-domain offset is predefined.

In one embodiment, the third frequency-domain offset is pre-configured.

In one embodiment, the third frequency-domain offset is configured.

In one embodiment, the third frequency-domain offset is fixed.

In one embodiment, the third frequency-domain offset is changeable.

In one embodiment, the third frequency-domain offset is a constant.

In one embodiment, the third frequency-domain offset is a variable.

Embodiment 8

Figure 8:
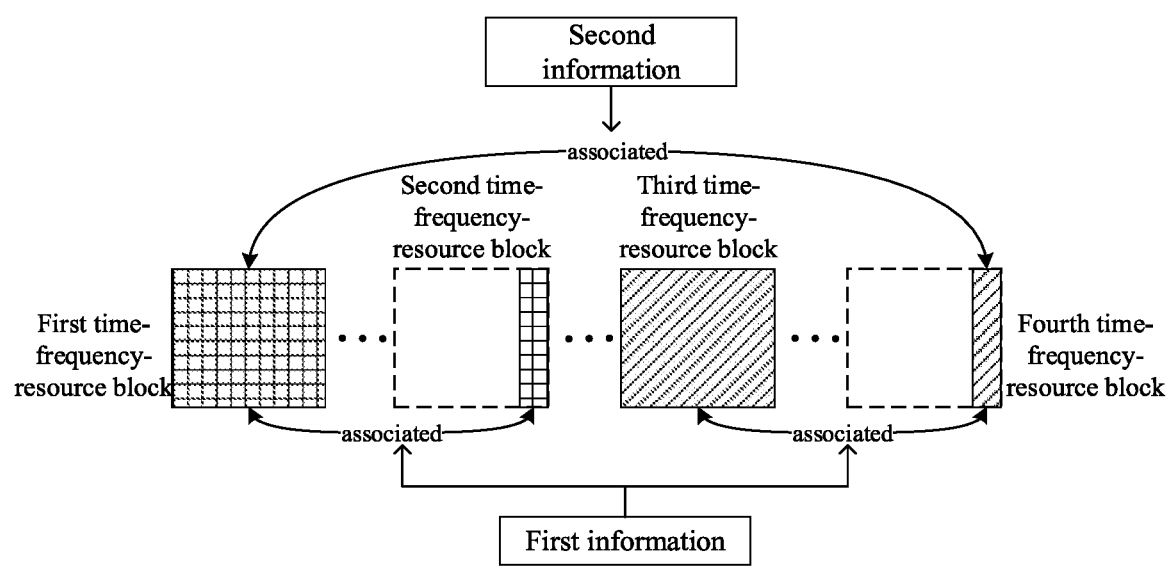
FIG. 8 illustrates a schematic diagram of a relationship between first information and second information according to one embodiment of the present disclosure.

Embodiment 8 illustrates a schematic diagram of a relationship between first information and second information according to one embodiment of the present disclosure, as shown in FIG. 8. In FIG. 8, the large solid box filled with small squares represents a first time-frequency-resource block in the present disclosure; the large dotted box where the rectangle filled with the small squares is located represents a second time-frequency-resource block in the present disclosure; the large solid box filled with slashes represents a third time-frequency-resource block in the present disclosure; the large dotted box where the rectangle filled with the slashes is located represents a fourth time-frequency-resource block in the present disclosure; the two unfilled solid boxes represent first information and second information in the present disclosure respectively.

In Embodiment 8, the first information is used for indicating that the second time-frequency-resource block is associated with the first time-frequency-resource block; the first information is used for indicating that the fourth time-frequency-resource block is associated with the third time-frequency-resource block; the second information indicates that the fourth time-frequency-resource block is associated with the first time-frequency-resource block; the second information is used for indicating that the second time-frequency-resource block cannot be used by a transmitter of the second information for transmitting the second signal.

In one embodiment, the first information is used for indicating that the second time-frequency-resource block is associated with the first time-frequency-resource block.

In one embodiment, the first information is used for indicating the second air-interface-resource block.

In one embodiment, the first information is used for indicating that the second air-interface-resource block is used for transferring feedback for the first bit-block set.

In one embodiment, the first information is used for indicating that the second air-interface-resource block is used for receiving feedback for the first bit-block set.

In one embodiment, the first information comprises a time-domain-resource unit occupied by the second air-interface-resource block in time domain.

In one embodiment, the first information comprises a frequency-domain-resource unit occupied by the second air-interface-resource block in frequency domain.

In one embodiment, the first information comprises a time-frequency-resource unit occupied by the second air-interface-resource block.

In one embodiment, the first information comprises an index of the second air-interface-resource block in the Q first-type air-interface-resource blocks.

In one embodiment, the first information comprises the first air-interface-resource block and the second air-interface-resource block.

In one embodiment, the first information comprises a time-domain-resource unit occupied by the first air-interface-resource block in time domain and a time-domain-resource unit occupied by the second air-interface-resource block in time domain.

In one embodiment, the first information comprises a frequency-domain-resource unit occupied by the first air-interface-resource block in frequency domain and a frequency-domain-resource unit occupied by the second air-interface-resource block in frequency domain.

In one embodiment, the first information comprises a time-frequency-resource unit occupied by the first air-interface-resource block and a time-frequency-resource unit occupied by the second air-interface-resource block.

In one embodiment, the first information comprises an index of the first air-interface-resource block in the Q first-type air-interface-resource blocks and an index of the second air-interface-resource block in the Q first-type air-interface-resource blocks.

In one embodiment, the first information comprises the first time-domain offset.

In one embodiment, the first information comprises the first frequency-domain offset.

In one embodiment, the first information comprises the first time-domain offset and the first frequency-domain offset.

In one embodiment, the first information is used for indicating that the fourth time-frequency-resource block is associated with the third time-frequency-resource block.

In one embodiment, the first information is used for indicating the fourth air-interface-resource block.

In one embodiment, the first information is used for indicating that the fourth air-interface-resource block is used for transferring feedback for the third bit-block set.

In one embodiment, the first information is used for indicating that the fourth air-interface-resource block is used for receiving feedback for the third bit-block set.

In one embodiment, the first information comprises a time-domain-resource unit occupied by the fourth air-interface-resource block in time domain.

In one embodiment, the first information comprises a frequency-domain-resource unit occupied by the fourth air-interface-resource block in frequency domain.

In one embodiment, the first information comprises a time-frequency-resource unit occupied by the fourth air-interface-resource block.

In one embodiment, the first information comprises an index of the fourth air-interface-resource block in the Q first-type air-interface-resource blocks.

In one embodiment, the first information comprises the third air-interface-resource block and the fourth air-interface-resource block.

In one embodiment, the first information comprises a time-domain-resource unit occupied by the third air-interface-resource block in time domain and a time-domain-resource unit occupied by the fourth air-interface-resource block in time domain.

In one embodiment, the first information comprises a frequency-domain-resource unit occupied by the third air-interface-resource block in frequency domain and a frequency-domain-resource unit occupied by the fourth air-interface-resource block in frequency domain.

In one embodiment, the first information comprises a time-frequency-resource unit occupied by the third air-interface-resource block and a time-frequency-resource unit occupied by the fourth air-interface-resource block.

In one embodiment, the first information comprises an index of the third air-interface-resource block in the Q first-type air-interface-resource blocks and an index of the fourth air-interface-resource block in the Q first-type air-interface-resource blocks.

In one embodiment, the first information comprises the second time-domain offset.

In one embodiment, the first information comprises the second frequency-domain offset.

In one embodiment, the first information comprises the second time-domain offset and the second frequency-domain offset.

In one embodiment, the second information is used for indicating that the fourth time-frequency-resource block is associated with the first time-frequency-resource block.

In one embodiment, the second information is used for indicating that the fourth time-frequency-resource block is a candidate for the second time-frequency-resource block.

In one embodiment, the second information is used for indicating the fourth time-frequency-resource block.

In one embodiment, the second information is used for indicating that the fourth time-frequency-resource block is used for transferring feedback for the first bit-block set.

In one embodiment, the second information is used for indicating that the fourth time-frequency-resource block is used for receiving feedback for the first bit-block set.

In one embodiment, the second information comprises a time-domain-resource unit occupied by the fourth time-frequency-resource block in time domain.

In one embodiment, the second information comprises a frequency-domain-resource unit occupied by the fourth time-frequency-resource block in frequency domain.

In one embodiment, the second information comprises a time-frequency-resource unit occupied by the fourth time-frequency-resource block.

In one embodiment, the second information comprises an index of the fourth time-frequency-resource block in the Q first-type time-frequency-resource blocks.

In one embodiment, the second information comprises the first time-frequency-resource block and the fourth time-frequency-resource block.

In one embodiment, the second information comprises a time-domain-resource unit occupied by the first time-frequency-resource block in time domain and a time-domain-resource unit occupied by the fourth time-frequency-resource block in time domain.

In one embodiment, the second information comprises a frequency-domain-resource unit occupied by the first time-frequency-resource block in frequency domain and a frequency-domain-resource unit occupied by the fourth time-frequency-resource block in frequency domain.

In one embodiment, the second information comprises a time-frequency-resource unit occupied by the first air-interface-resource block and a time-frequency-resource unit occupied by the fourth time-frequency-resource block.

In one embodiment, the second information comprises an index of the first time-frequency-resource block in the Q first-type time-frequency-resource blocks and an index of the fourth time-frequency-resource block in the Q first-type time-frequency-resource blocks.

In one embodiment, the second information comprises the third time-domain offset.

In one embodiment, the second information comprises the third frequency-domain offset.

In one embodiment, the second information comprises the third time-domain offset and the third frequency-domain offset.

Embodiment 9

Figure 9:
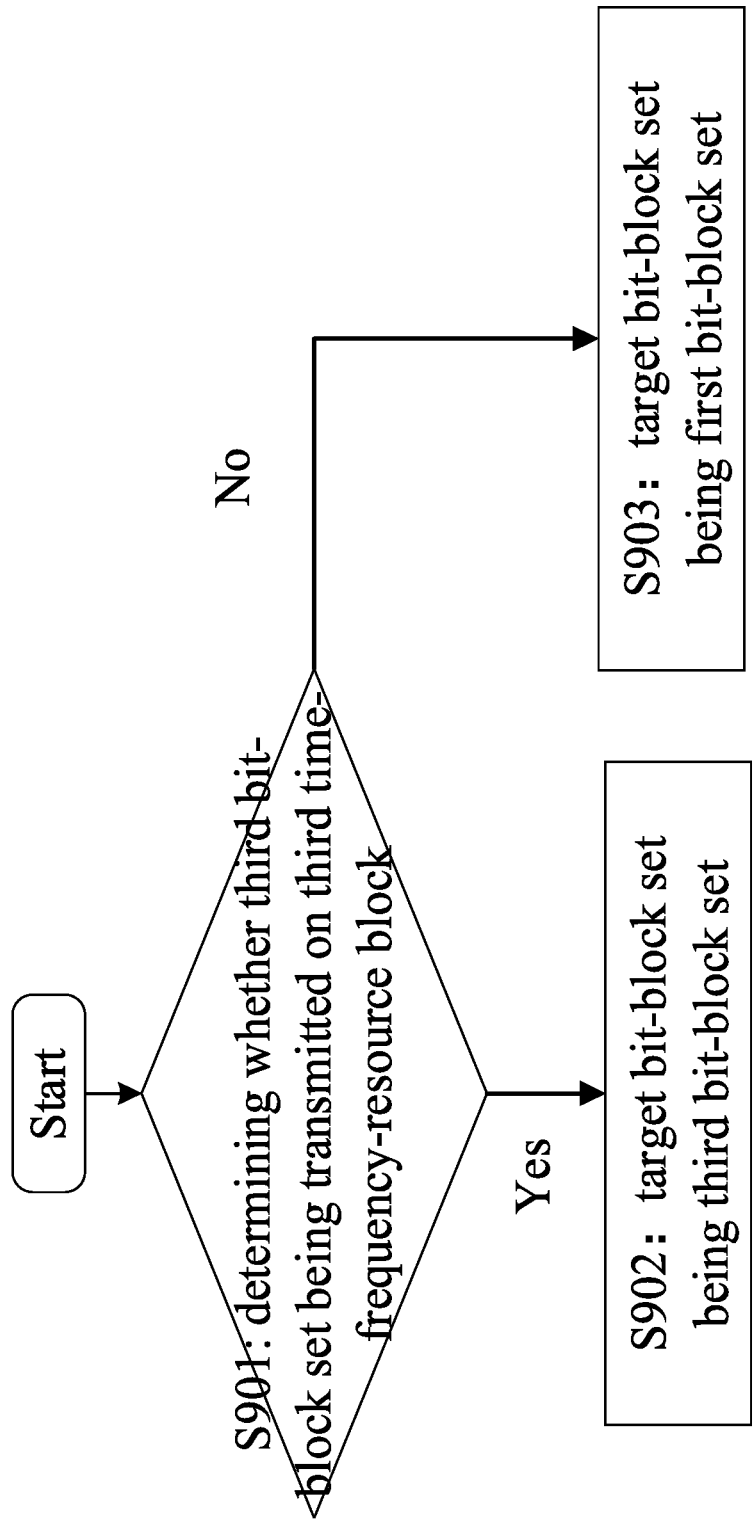
FIG. 9 illustrates a flowchart for determining a target bit block according to one embodiment of the present disclosure.

Embodiment 9 illustrates a flowchart for determining a target bit block according to one embodiment of the present disclosure, as shown in FIG. 9.

In Embodiment 9, whether a third bit-block set is transmitted on a third time-frequency-resource block is determined in step S901; when the result of determining whether a third bit-block set is transmitted on a third time-frequency-resource block is "yes", step S902 is performed, and a target bit-block set is a third bit-block set; when the result of determining whether a third bit-block set is transmitted on a third time-frequency-resource block is "no", step S903 is performed, and a target bit-block set is a first bit-block set;

In one embodiment, the target bit-block set is one of the third bit-block set and the first bit-block set.

In one embodiment, the target bit-block set is the third bit-block set.

In one embodiment, the target bit-block set is the first bit-block set.

In one embodiment, when the third bit-block set is transmitted on the third time-frequency-resource block, the result of determining whether a third bit-block set is transmitted on a third time-frequency-resource block is "yes".

In one embodiment, when the third bit-block set is not transmitted on the third time-frequency-resource block, the result of determining whether a third bit-block set is transmitted on a third time-frequency-resource block is "no".

In one embodiment, when the third bit-block set is transmitted on the third time-frequency-resource block, the target bit-block set is the third bit-block set.

In one embodiment, when the third bit-block set is not transmitted on the third time-frequency-resource block, the target bit-block set is the first bit-block set.

In one embodiment, when the first node transmits the third bit-block set on the third time-frequency-resource block, the target bit-block set is the third bit-block set.

In one embodiment, when the first node drops transmission of the third bit-block set on the third time-frequency-resource block, the target bit-block set is the first bit-block set.

In one embodiment, when the first node transmits the third bit-block set on the third time-frequency-resource block, the second signal is associated with the third bit-block set.

In one embodiment, when the first node drops transmission of the third bit-block set on the third time-frequency-resource block, the second signal is associated with the first bit-block set.

In one embodiment, when transmission of the third bit-block set on the third time-frequency-resource block is dropped, the feedback for the first bit-block set is monitored on the fourth time-frequency-resource block.

In one embodiment, when the third bit-block set is transmitted on the third time-frequency-resource block, the feedback for the third bit-block set is monitored on the fourth time-frequency-resource block.

Embodiment 10

Figure 10:
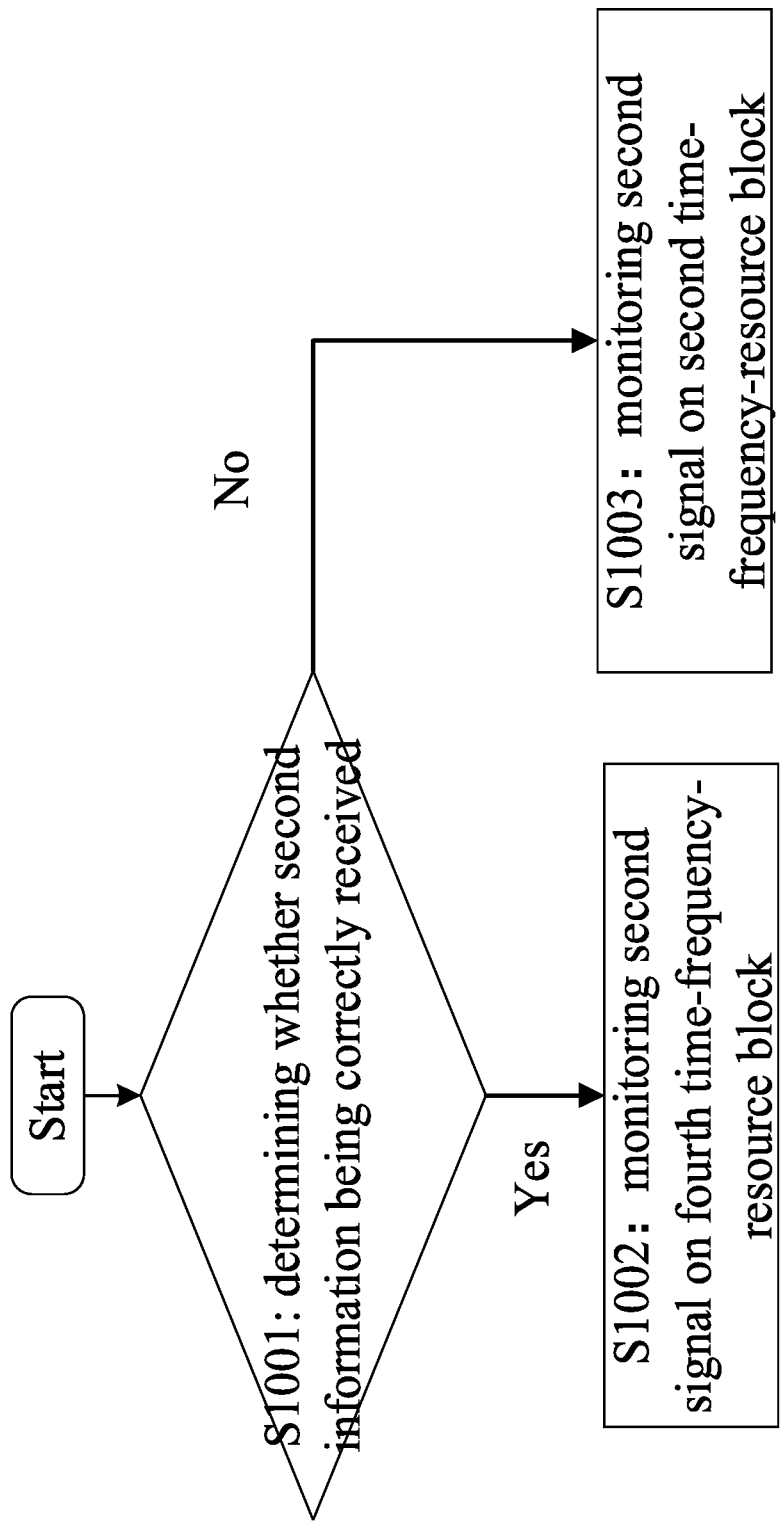
FIG. 10 illustrates a flowchart for determining whether a second signal is monitored on a fourth time-frequency-resource block according to one embodiment of the present disclosure.

Embodiment 10 illustrates a flowchart for determining whether a second signal is monitored on a fourth time-frequency-resource block according to one embodiment of the present disclosure, as shown in FIG. 10.

In Embodiment 10, whether second information is correctly received is determined in step S1001; when the result of determining whether second information is correctly received is "yes", step S1002 is performed to monitor a second signal on a fourth time-frequency-resource block; when the result of determining whether second information is correctly received is "no", step S1003 is performed to monitor a second signal on a second time-frequency-resource block.

In one embodiment, the second information is used for determining that the second time-frequency-resource block cannot be used by a transmitter of the second information for transmitting the second signal.

In one embodiment, the second information is used for indicating that the second time-frequency-resource block cannot be used by the second node for transmitting a radio signal.

In one embodiment, the second information is used for indicating that the second time-frequency-resource block cannot be used by the second node for transferring a SL.

In one embodiment, the second information is used for indicating that the second time-frequency-resource block does not belong to an SL resource pool of the second node.

In one embodiment, the second information is used for indicating that the second time-frequency-resource block cannot be used by the second node for transmitting the second signal.

In one embodiment, when the second information is correctly received, the result of determining whether second information is correctly received is "yes".

In one embodiment, when the second information is not correctly received, the result of determining whether second information is correctly received is "no".

In one embodiment, when the second information is correctly received, monitoring of a second signal on the second time-frequency-resource block is dropped.

In one embodiment, when the second information is correctly received, a second signal is monitored on the fourth time-frequency-resource block.

In one embodiment, when the second information is correctly received, a second signal is received on the fourth time-frequency-resource block.

In one embodiment, when the second information is not correctly received, a second signal is monitored on the second time-frequency-resource block.

In one embodiment, when the second information is not correctly received, a second signal is received on the second time-frequency-resource block.

In one embodiment, when the second information is not correctly received, monitoring of a second signal on the fourth time-frequency-resource block is dropped.

In one embodiment, the second information is correctly received, comprising: a result of channel decoding on the second information passes CRC check.

In one embodiment, the second information is correctly received, comprising: a result of receiving power detection performed on the second information is higher than a given receiving power threshold.

In one embodiment, the second information is correctly received, comprising: an average value of multiple receiving power detections performed on the second information is higher than a given receiving power threshold.

In one embodiment, the second information is not correctly received, comprising: a result of channel decoding on the second information does not pass the CRC check.

In one embodiment, the second information is not correctly received, comprising: a result of receiving power detection performed on the second information is not higher than a given receiving power threshold.

In one embodiment, the second information is not correctly received, comprising: an average value of multiple receiving power detections performed on the second information is not higher than a given receiving power threshold.

In one embodiment, the being correctly received, comprising: performing channel decoding on a radio signal, and a result of the performing channel decoding on a radio signal passes CRC check.

In one embodiment, the being correctly received, comprising: performing energy detection on the radio signal in a duration, and an average value of a result of the performing energy detection on the radio signal in a duration exceeds a first given threshold.

In one embodiment, the being correctly received, comprising: performing coherent detection on the radio signal, and signal energy obtained from the performing coherent detection on the radio signal exceeds a second given threshold.

In one embodiment, the channel decoding is based on Viterbi algorithm.

In one embodiment, the channel decoding is based on iteration.

In one embodiment, the channel decoding is based on Belief Propagation (BP) algorithm.

In one embodiment, the channel decoding is based on Log Likelihood Ratio (LLR)-BP algorithm.

In one embodiment, the monitoring a second signal refers to performing a reception based on a blind detection on the second signal, that is, the first node receives a signal on a first target time-frequency-resource block and performs decoding; if the decoding is determined to be correct according to a CRC bit, it is determined that the second signal is successfully received on the first target time-frequency-resource block. otherwise, it is determined that the second signal is not successfully detected on the first target time-frequency-resource block.

In one embodiment, the monitoring a second signal refers to performing a reception based on coherent detection on the second signal, that is, the first node performs a coherent reception on a radio signal with an RS sequence corresponding to the second signal on a first target time-frequency-resource block, and measures energy of a signal obtained after the coherent reception; if the energy of the signal obtained after the coherent reception is greater than a first given threshold, it is determined that the second signal is successfully received on the first target time-frequency-resource block; otherwise, it is determined that the second signal is not successfully detected on the first time-frequency-resource block.

In one embodiment, the monitoring a second signal refers to performing a reception based on energy detection on the second signal, that is, the first node senses energy of a radio signal on the first target time-frequency-resource block and averages it in time to obtain received energy; if the received energy is greater than a second given threshold, it is determined that the first signal is successfully received on the first target time-frequency-resource block; otherwise, it is determined that the second signal is not successfully detected on the first target time-frequency-resource block.

In one embodiment, the dropping monitoring of a second signal refers to that the second signal does not perform a reception based on a blind detection.

In one embodiment, the dropping monitoring of a second signal refers to that the second signal does not perform a reception based on a coherent detection.

In one embodiment, the dropping monitoring of a second signal refers to that the second signal does not perform a reception based on an energy detection.

In one embodiment, the first target time-frequency-resource block comprises a positive integer number of time-frequency-resource unit(s).

In one embodiment, the first target time-frequency-resource block comprises a positive integer number of RE(s).

In one embodiment, the first target time-frequency-resource block is one of the fourth time-frequency-resource block or the second time-frequency-resource block.

In one embodiment, the first target time-frequency-resource block is the fourth time-frequency-resource block.

In one embodiment, the first target time-frequency-resource block is the second time-frequency-resource block.

In one embodiment, when the second information is correctly received, the first target time-frequency-resource block is the fourth time-frequency-resource block.

In one embodiment, when the second information is not correctly received, the first target time-frequency-resource block is the second time-frequency-resource block.

Embodiment 11

Figure 11:
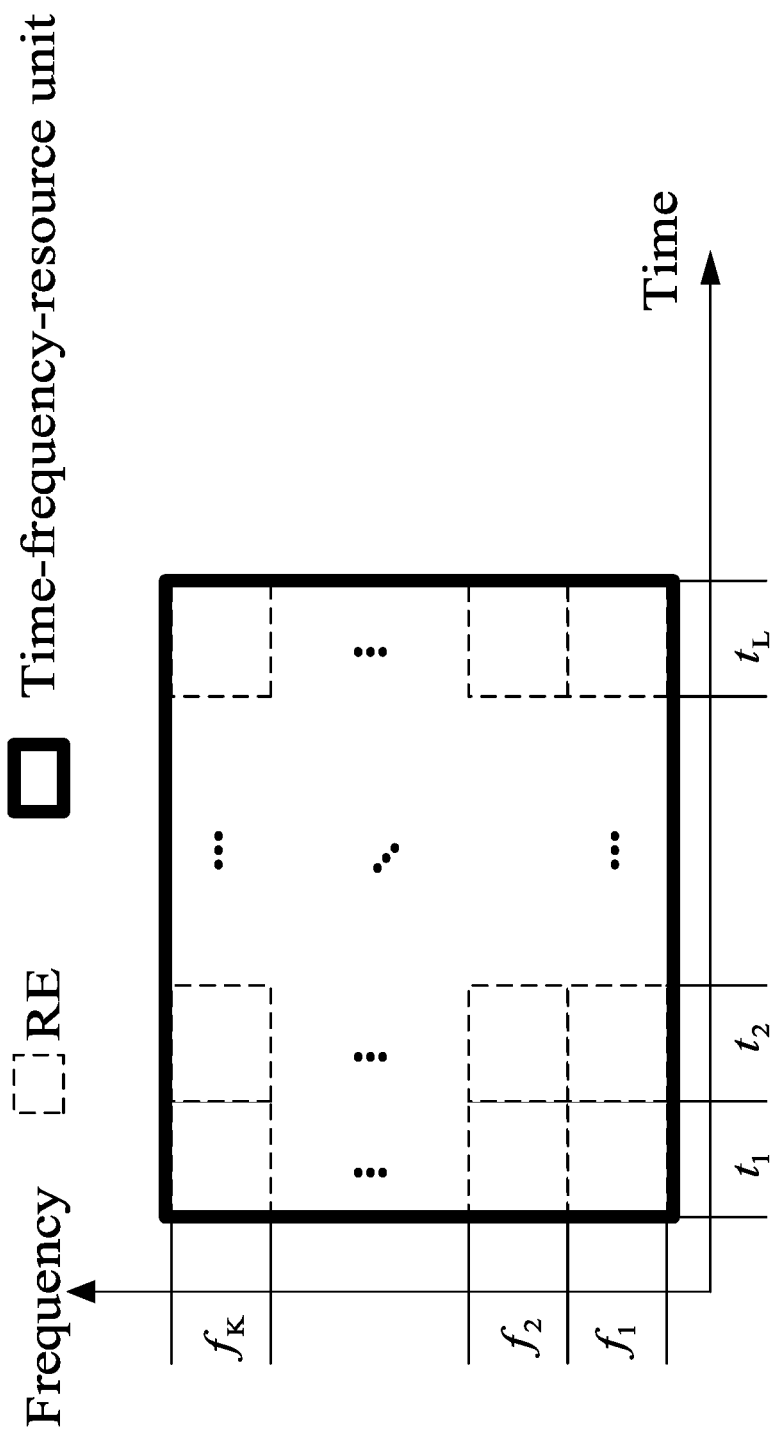
FIG. 11 illustrates a schematic diagram of a time-frequency-resource unit according to one embodiment of the present disclosure.

Embodiment 11 illustrates a schematic diagram of a time-frequency-resource unit according to one embodiment of the present disclosure, as shown in FIG. 11. In FIG. 11, a small dotted box represents a Resource Element (RE), and a bold box represents a time-frequency-resource unit. In FIG. 11, a time-frequency-resource unit occupies K subcarrier(s) in frequency domain, and L multicarrier symbol(s) in time domain, K and L being positive integers. In FIG. 11, $t_1$, $t_2$, ..., $t_L$ represent(s) the L symbol(s), and $f_1$, $f_2$, ..., $f_K$ represent(s) the K subcarrier(s).

In Embodiment 11, a time-frequency-resource unit occupies the K subcarrier(s) in frequency domain and the L multicarrier symbol(s) in time domain, the K and the L being positive integers.

In one embodiment, the K is equal to 12.
In one embodiment, the K is equal to 72.
In one embodiment, the K is equal to 127.
In one embodiment, the K is equal to 240.
In one embodiment, the L is equal to 1.
In one embodiment, the L is equal to 2.
In one embodiment, the L is not greater than 14.
In one embodiment, any of the L multicarrier symbol(s) is an OFDM symbol.
In one embodiment, any of the L multicarrier symbol(s) is an SC-FDMA symbol.
In one embodiment, any of the L multicarrier symbol(s) is a DFT-S-OFDM symbol.
In one embodiment, any of the L multicarrier symbol(s) is a Frequency Division Multiple Access (FDMA) symbol.
In one embodiment, any of the L multicarrier symbol(s) is a Filter Bank Multi-Carrier (FBMC) symbol.
In one embodiment, any of the L multicarrier symbol(s) is an Interleaved Frequency Division Multiple Access (IFDMA) symbol.
In one embodiment, the time-domain-resource unit comprises a positive integer number of radio frame(s).
In one embodiment, the time-domain-resource unit comprises a positive integer number of subframe(s).
In one embodiment, the time-domain-resource unit comprises a positive integer number of slot(s).

In one embodiment, the time-domain-resource unit is a slot.

In one embodiment, the time-domain-resource unit comprises a positive integer number of multicarrier symbol(s).

In one embodiment, the frequency-domain-resource unit comprises a positive integer number of carrier(s).

In one embodiment, the frequency-domain-resource unit comprises a positive integer number of Bandwidth Part(s) (BWP).

In one embodiment, the frequency-domain-resource unit is a BWP.

In one embodiment, the frequency-domain-resource unit comprises a positive integer number of subchannel(s).

In one embodiment, the frequency-domain-resource unit is a subchannel.

In one embodiment, any of the positive integer number of sub-channel(s) comprises a positive integer number of Resource Block(s)(RB).

In one embodiment, the sub-channel comprises a positive integer number of RB(s).

In one embodiment, any of the positive integer number of RB(s) comprises a positive integer number of sub-carrier(s) in frequency domain.

In one embodiment, any of the positive integer number of RB(s) comprises 12 sub-carriers in frequency domain.

In one embodiment, the sub-channel comprises a positive integer number of PRB(s).

In one embodiment, a number of PRB(s) comprised in the one subchannel is variable.

In one embodiment, any of the positive integer number of PRB(s) comprises a positive integer number of sub-carrier(s) in frequency domain.

In one embodiment, any of the positive integer number of PRB(s) comprises 12 sub-carrier(s) in frequency domain.

In one embodiment, the frequency-domain-resource unit comprises a positive integer number of RB(s).

In one embodiment, the frequency-domain-resource unit is an RB.

In one embodiment, the frequency-domain-resource unit comprises a positive integer number of PRB(s).

In one embodiment, the frequency-domain-resource unit is an PRB.

In one embodiment, the frequency-domain-resource unit comprises a positive integer number of subcarrier(s).

In one embodiment, the frequency-domain-resource unit is a subcarrier.

In one embodiment, the time-frequency-resource unit comprises the time-domain-resource unit.

In one embodiment, the time-frequency-resource unit comprises the frequency-domain-resource unit.

In one embodiment, the time-frequency-resource unit comprises the time-domain-resource unit and the frequency-domain-resource unit.

In one embodiment, the time-frequency-resource unit comprises R RE(s), R being a positive integer.

In one embodiment, the time-frequency-resource unit consists of R RE(s), R being a positive integer.

In one embodiment, any of the R RE(s) occupies a multicarrier symbol in time domain and a subcarrier in frequency domain.

In one embodiment, the subcarrier spacing is measured by Hertz (Hz).

In one embodiment, the subcarrier spacing is measured by Kilohertz (kHz).

In one embodiment, the subcarrier spacing is measured by Megahertz (MHz).

In one embodiment, a symbol length of the one multicarrier symbol is measured by sampling point.

In one embodiment, a symbol length of the one multicarrier symbol is measured by microsecond (µs).

In one embodiment, a symbol length of the one multicarrier symbol is measured by millisecond (ms).

In one embodiment, the subcarrier spacing is at least one of 1.25 khz, 2.5 KHz, 5 KHz, 15 KHz, 30 kHz, 60 KHZ, 120 kHz or 240 khz.

In one embodiment, the time-frequency-resource unit comprises the K subcarrier(s) and the L multicarrier symbol(s), and a product of the K and the L is not less than the R.

In one embodiment, the time-frequency-resource unit does not comprise an RE allocated to a Guard Period (GP).

In one embodiment, the time-frequency-resource unit does not comprise an RE allocated to a Reference Signal (RS).

In one embodiment, the time-frequency-resource unit comprises a positive integer number of RB(s).

In one embodiment, the time-frequency-resource unit belongs to an RB.

In one embodiment, the time-frequency-resource unit is equal to an RB in frequency domain.

In one embodiment, the time-frequency-resource unit comprises 6 RBs in frequency domain.

In one embodiment, the time-frequency-resource unit comprises 20 RBs in frequency domain.

In one embodiment, the time-frequency-resource unit comprises a positive integer number of Physical Resource Block(s)(PRB).

In one embodiment, the time-frequency-resource unit belongs to a PRB.

In one embodiment, the time-frequency-resource unit is equal to a PRB in frequency domain.

In one embodiment, the time-frequency-resource unit comprises a positive integer number of Virtual Resource Block(s) (VRB).

In one embodiment, the time-frequency-resource unit belongs to a VRB.

In one embodiment, the time-frequency-resource unit is equal to a VRB in frequency domain.

In one embodiment, the time-frequency-resource unit comprises a positive integer number of PRB pair(s)

In one embodiment, the time-frequency-resource unit belongs to a PRB pair.

In one embodiment, the time-frequency-resource unit is equal to a PRB pair in frequency domain.

In one embodiment, the time-frequency-resource unit comprises a positive integer number of radio frame(s).

In one embodiment, the time-frequency-resource unit belongs to a radio frame.

In one embodiment, the time-frequency-resource unit is equal to a radio frame in time domain.

In one embodiment, the time-frequency-resource unit comprises a positive integer number of subframe(s).

In one embodiment, the time-frequency-resource unit belongs to a subframe.

In one embodiment, the time-frequency-resource unit is equal to a subframe in time domain.

In one embodiment, the time-frequency-resource unit comprises a positive integer number of slot(s).

In one embodiment, the time-frequency-resource unit belongs to a slot.

In one embodiment, the time-frequency-resource unit is equal to a slot in time domain.

In one embodiment, the time-frequency-resource unit comprises a positive integer number of Symbol(s).

In one embodiment, the time-frequency-resource unit belongs to a Symbol.

In one embodiment, the time-frequency-resource unit is equal to a Symbol in time domain.

In one embodiment, a duration of the time-domain-resource unit in the present disclosure is equal to a duration of the time-frequency-resource unit in time domain in the present disclosure.

In one embodiment, a number of multi-carrier symbol(s) occupied by the time-frequency-resource unit in time domain in the present disclosure is equal to a number of multi-carrier symbol(s) occupied by the time-domain-resource unit in time domain in the present disclosure.

In one embodiment, a number of subcarrier(s) occupied by the frequency-domain-resource unit in the present disclosure is equal to a number of subcarrier(s) of the time-frequency-resource unit in frequency domain in the present disclosure.

In one embodiment, the Q first-type time-frequency-resource blocks are used for SL transmission.

In one embodiment, the Q first-type time-frequency-resource blocks are used for V2X.

In one embodiment, the Q first-type time-frequency-resource blocks belong to a V2X resource pool.

In one embodiment, the Q first-type time-frequency-resource blocks belong to a SL resource pool.

In one embodiment, the Q first-type time-frequency-resource blocks are configured.

In one embodiment, the Q first-type time-frequency-resource blocks are configured by a base station.

In one embodiment, the Q first-type time-frequency-resource blocks are pre-configured.

In one embodiment, the Q first-type time-frequency-resource blocks are predefined.

In one embodiment, the Q first-type time-frequency-resource blocks are configured by a higher-layer signaling.

In one embodiment, the Q first-type time-frequency-resource blocks are configured by an RRC signaling.

In one embodiment, the Q first-type time-frequency-resource blocks are configured by an RRC IE.

In one embodiment, the Q first-type time-frequency-resource blocks are configured by a dynamic signaling.

In one embodiment, the Q first-type time-frequency-resource blocks are indicated by DCI.

In one embodiment, the Q first-type time-frequency-resource blocks are indicated by SCI.

In one embodiment, at least one of the Q first-type time-frequency-resource blocks is indicated by a physical-layer signaling.

In one embodiment, at least one of the Q first-type time-frequency-resource blocks is indicated by DCI.

In one embodiment, at least one of the Q first-type time-frequency-resource blocks is indicated by SCI.

In one embodiment, at least one of the Q first-type time-frequency-resource blocks is selected by the first node itself.

In one embodiment, at least one of the Q first-type time-frequency-resource blocks is obtained by the first node through Sensing.

In one embodiment, at least one of the Q first-type time-frequency-resource blocks is obtained by the first node through Resource Selection.

In one embodiment, at least one of the Q first-type time-frequency-resource blocks is obtained by the first node through Resource Re-selection.

In one embodiment, at least one of the Q first-type time-frequency-resource blocks is obtained by the first node according to received signal quality.

In one embodiment, at least one of the Q first-type time-frequency-resource blocks is selected by the second node itself.

In one embodiment, at least one of the Q first type time-frequency-resource blocks is obtained by the second node through Sensing.

In one embodiment, at least one of the Q first type time-frequency-resource blocks is obtained by the second node through Resource Selection.

In one embodiment, at least one of the Q first type time-frequency-resource blocks is obtained by the second node through Resource Re-selection.

In one embodiment, at least one of the Q first-type time-frequency-resource blocks is obtained by the second node according to received signal quality.

In one embodiment, the signal quality comprises RSRP.

In one embodiment, the signal quality comprises RSRQ.

In one embodiment, the signal quality comprises an RSSI.

In one embodiment, the signal quality is average power of signal(s) received in a positive integer number of time-frequency-resource unit(s).

In one subembodiment of the above embodiment, the signals received in the positive integer number of time-frequency-resource unit(s) comprise an RS, a data signal, an interference signal and a noise signal.

In one embodiment, the signal quality comprises an SNR.

In one embodiment, the signal quality comprises an SINR.

In one embodiment, any of the Q first-type time-frequency-resource blocks comprises a positive integer number of time-domain-resource unit(s) in time domain.

In one embodiment, the positive integer number of time-domain-resource unit(s) comprised in any of the Q first-type time-frequency-resource blocks is(are) consecutive in time.

In one embodiment, at least two of the positive integer number of time-domain-resource units comprised in any of the Q first-type time-frequency-resource blocks are inconsecutive in time.

In one embodiment, any of the Q first-type time-frequency-resource blocks comprises a positive integer number of frequency-domain-resource unit(s) in frequency domain.

In one embodiment, the positive integer number of frequency-domain-resource unit(s) comprised in any of the Q first-type time-frequency-resource blocks is(are) consecutive in frequency domain.

In one embodiment, at least two of the positive integer number of frequency-domain-resource units comprised in any of the Q first-type time-frequency-resource blocks are inconsecutive in frequency domain.

In one embodiment, any of the Q first-type time-frequency-resource blocks comprises a positive integer number of time-frequency-resource unit(s).

In one embodiment, the positive integer number of time-frequency-resource unit(s) comprised in any of the Q first-type time-frequency-resource blocks is(are) consecutive in time domain.

In one embodiment, the positive integer number of time-frequency-resource unit(s) comprised in any of the Q first-type time-frequency-resource blocks is(are) consecutive in frequency domain.

In one embodiment, at least two of the positive integer number of time-frequency-resource units comprised in any of the Q first-type time-frequency-resource blocks are inconsecutive in time domain.

In one embodiment, at least two of the positive integer number of time-frequency-resource units comprised in any of the Q first-type time-frequency-resource blocks are inconsecutive in frequency domain.

In one embodiment, any of the Q first-type time-frequency-resource blocks comprises a positive integer number of RE(s).

In one embodiment, a time-domain-resource unit occupied by any of the Q first-type time-frequency-resource blocks in time domain is a subframe.

In one embodiment, a time-domain-resource unit occupied by any of the Q first-type time-frequency-resource blocks in time domain is a slot.

In one embodiment, a frequency-domain-resource unit occupied by any of the Q first-type time-frequency-resource blocks in frequency domain is a subchannel.

In one embodiment, a frequency-domain-resource unit occupied by any of the Q first-type time-frequency-resource blocks in frequency domain comprises a positive integer number of subchannel(s).

In one embodiment, the Q first-type time-frequency-resource blocks occupy Q subframes respectively in time domain.

In one embodiment, the Q first-type time-frequency-resource blocks occupy Q slots respectively in time domain.

In one embodiment, the Q first-type time-frequency-resource blocks occupy Q subchannels respectively in time domain.

In one embodiment, at least one of the Q first-type time-frequency-resource blocks comprises a PSFCH.

In one embodiment, at least one of the Q first-type time-frequency-resource blocks comprises a PSCCH.

In one embodiment, at least one of the Q first-type time-frequency-resource blocks comprises a PSSCH.

In one embodiment, at least one of the Q first-type time-frequency-resource blocks comprises a PSCCH and a PSSCH.

Embodiment 12

Figure 12:
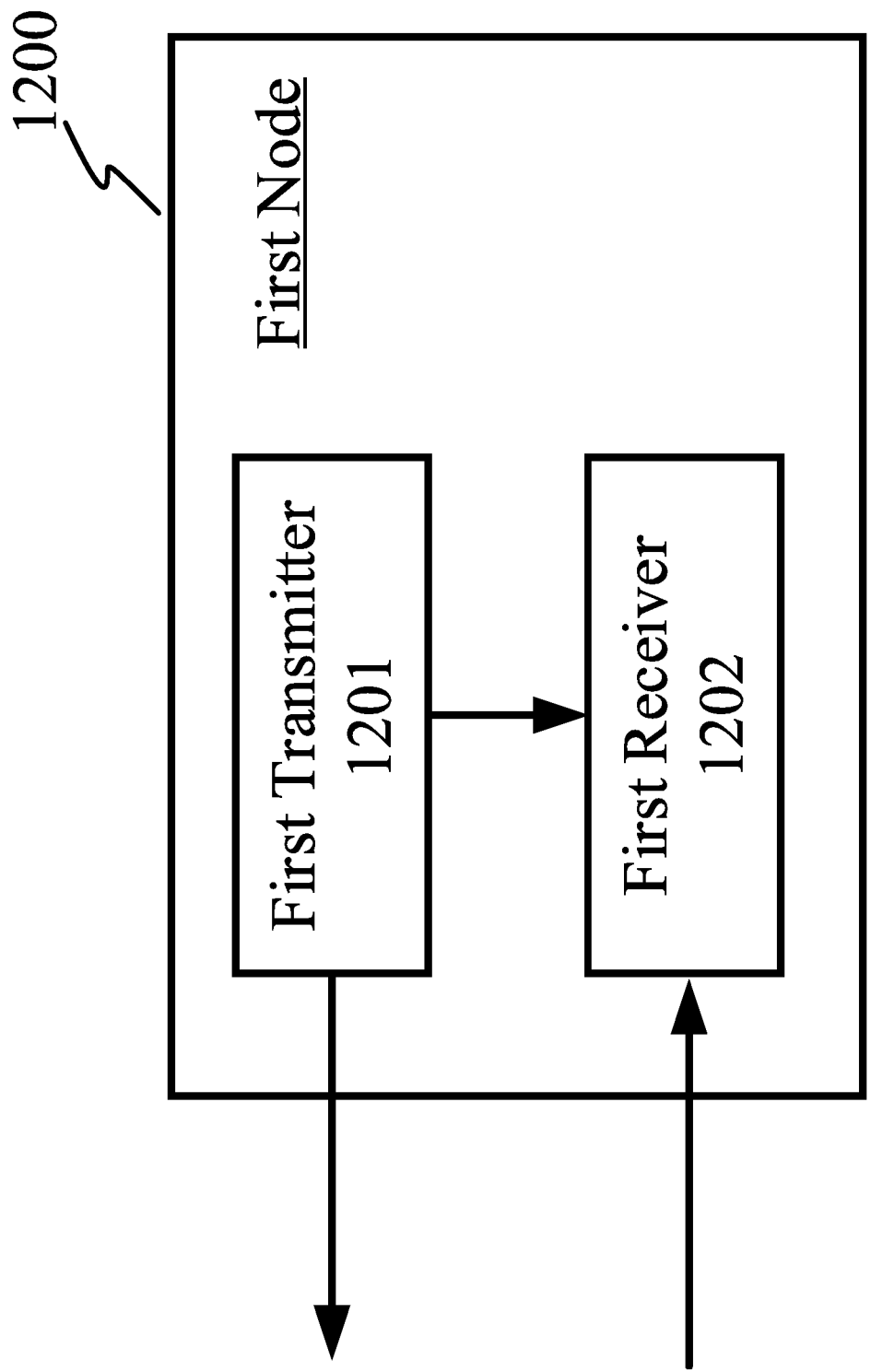
FIG. 12 illustrates a structure block diagram of a processing device in a first node according to one embodiment of the present disclosure.

Embodiment 12 illustrates a structural block diagram of a processing apparatus used in a first node, as shown in FIG. 12. In Embodiment 12, a first node processing apparatus 1200 mainly consists of a first transmitter 1201 and a first receiver 1202.

In one embodiment, the first transmitter 1201 comprises at least one of an antenna 452, a transmitter/receiver 454, a multi-antenna transmitting processor 457, a transmitting processor 468, a controller/processor 459, a memory 460, or a data source 467 in FIG. 4 of the present disclosure.

In one embodiment, the first receiver 1202 comprises at least one of an antenna 452, a transmitter/receiver 454, a multi-antenna receiving processor 458, a receiving processor 456, a controller/processor 459, a memory 460 or a data source 467 in FIG. 4 of the present disclosure.

In Embodiment 12, the first transmitter 1201 transmits first information; the first receiver 1202 receives second information; the first transmitter 1201 transmits a first bit-block set on a first time-frequency-resource block; the first transmitter 1201 transmits or drops transmission of a third bit-block set on a third time-frequency-resource block; the first receiver 1202 receives a second signal on a fourth time-frequency-resource block; the first information is used for indicating Q first-type time-frequency-resource blocks, the Q being a positive integer greater than 1; the first time-frequency-resource block and the third time-frequency-resource block are two of the Q first-type time-frequency-resource blocks respectively; the first information is used for indicating that the fourth time-frequency-resource block is associated with the third time-frequency-resource block; the second information indicates that the fourth time-frequency-resource block is associated with the first time-frequency-resource block; the second signal is used for indicating whether a target bit-block set is correctly received; when the first transmitter 1201 transmits the third bit-block set on the third time-frequency-resource block, the target bit-block set is the third bit-block set, otherwise the target bit-block set is the first bit-block set.

In one embodiment, the first transmitter 1201 transmits a first signaling on the first time-frequency-resource block; the first signaling is used for scheduling the first bit-block set; the first signaling comprises third information, the third information being used for determining the third time-frequency-resource block.

In one embodiment, the first information is used for indicating that a second time-frequency-resource block is associated with the first time-frequency-resource block; the second information is used for determining that the second time-frequency-resource block cannot be used by a transmitter of the second information for transmitting the second signal.

In one embodiment, when the second information is not correctly received by the first receiver 1202, the first receiver 1202 receives the second signal on the second time-frequency-resource block.

In one embodiment, the first receiver 1202 receives fourth information; the first receiver 1202 drops reception of the second signal on the fourth time-frequency-resource block. the fourth information indicates that the fourth time-frequency-resource block cannot be used by a transmitter of the second information for transmitting a radio signal.

In one embodiment, the first node 1200 is a UE.

In one embodiment, the first node 1200 is a relay node.

In one embodiment, the first node 1200 is a base station.

In one embodiment, the first node 1200 is a vehicle-mounted communication device.

In one embodiment, the first node 1200 is a UE supporting V2X communications.

In one embodiment, the first node 1200 is a relay node supporting V2X communications.

Embodiment 13

Figure 13:
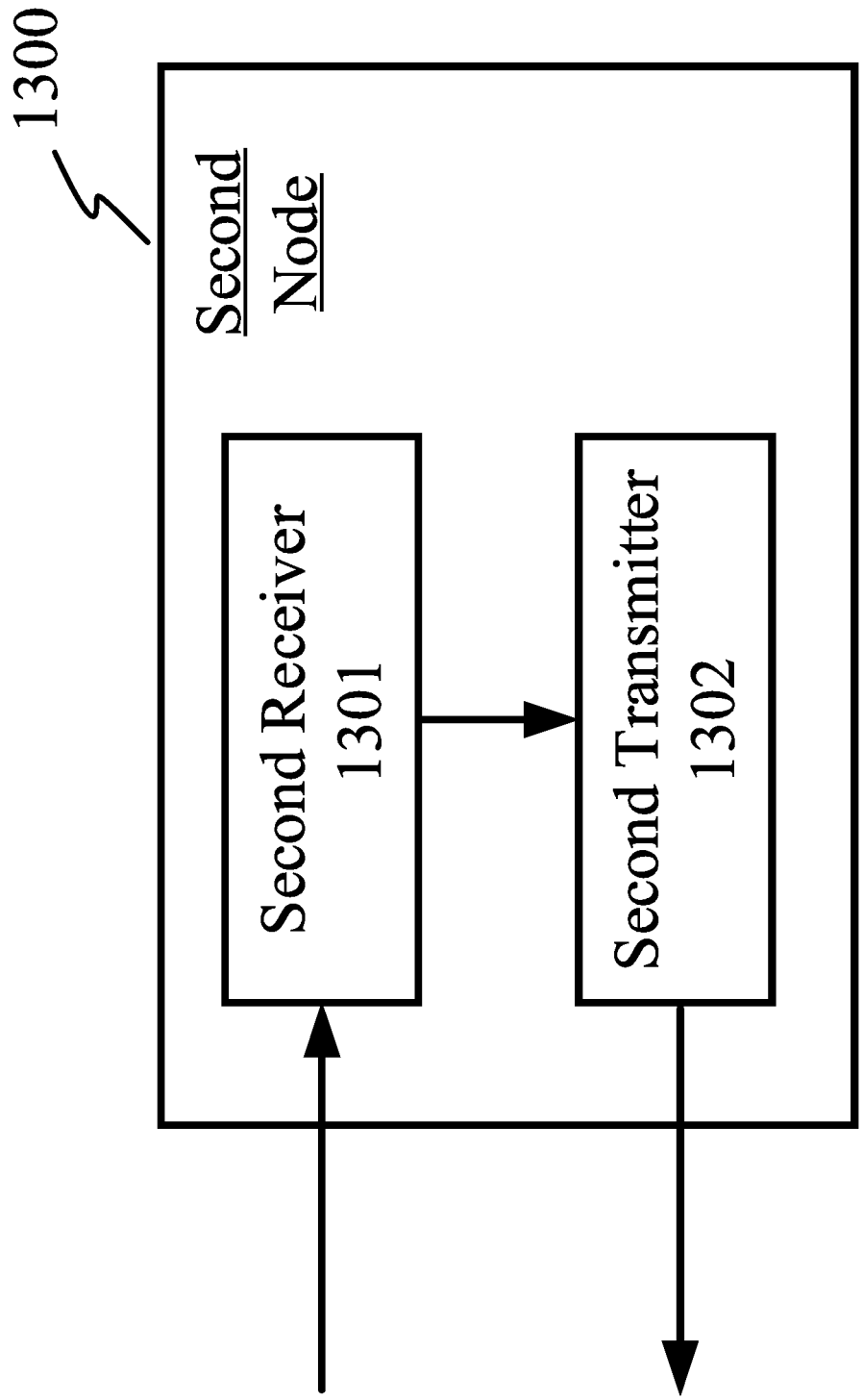
FIG. 13 illustrates a structure block diagram of a processing device in a second node according to one embodiment of the present disclosure.

Embodiment 13 illustrates a structural block diagram of a processing apparatus used in a second node, as shown in FIG. 13. In FIG. 13, the second node processing apparatus 1300 mainly consists of a second receiver 1301 and a second transmitter 1302.

In one embodiment, the second receiver 1301 comprises at least one of the antenna 420, the transmitter/receiver 418, the multi-antenna receiving processor 472, the receiving processor 470, the controller/processor 475 and the memory 476 in FIG. 4 in the present disclosure.

In one embodiment, the second transmitter 1302 comprises at least one of the antenna 420, the transmitter/receiver 418, the multi-antenna transmitting processor 471, the transmitting processor 416, the controller/processor 475 and the memory 476 in FIG. 4 in the present disclosure.

In Embodiment 13, the second receiver 1301 receives first information; the second transmitter 1302 transmits second information; the second receiver 1301 receives a first bit-block set on a first time-frequency-resource block; the second receiver 1301 monitors a third bit-block set on a third time-frequency-resource block; the second transmitter 1302 transmits a second signal on a fourth time-frequency-resource block; the first information is used for indicating Q first-type time-frequency-resource blocks, Q being a positive integer greater than 1; the first time-frequency-resource block and the third time-frequency-resource block are two of the Q first-type time-frequency-resource blocks respectively; the first information is used for indicating that the fourth time-frequency-resource block is associated with the third time-frequency-resource block; the second information indicates that the fourth time-frequency-resource block is associated with the first time-frequency-resource block; the second signal indicates whether a target bit-block set is correctly received; when the third bit-block set is detected on the third time-frequency-resource block, the target bit-block set is the third bit-block set, otherwise the target bit-block set is the first bit-block set.

In one embodiment, the second receiver 1301 receives a first signaling on the first time-frequency-resource block; the first signaling is used for scheduling the first bit-block set; and the first signaling comprises third information, the third information being used for determining the third time-frequency-resource block.

In one embodiment, the first information is used for indicating that a second time-frequency-resource block is associated with the first time-frequency-resource block; the second information indicates that the second time-frequency-resource block cannot be used by the second node for transmitting the second signal.

In one embodiment, when the second transmitter 1302 does not transmit the second information, the second transmitter 1302 transmits the second signal on the second time-frequency-resource block.

In one embodiment, the second receiver 1301 receives fourth information; the second transmitter 1302 drops transmission of the second signal on the fourth time-frequency-resource block; the fourth information indicates that the fourth time-frequency-resource block cannot be used by the second transmitter 1302 for transmitting a radio signal.

In one embodiment, the second node 1300 is a UE.

In one embodiment, the second node 1300 is a base station.

In one embodiment, the second node 1300 is a relay node.

In one embodiment, the second node 1300 is a UE supporting V2X communications.

In one embodiment, the second node 1300 is a base station supporting V2X communications.

In one embodiment, the second node 1300 is a relay node supporting V2X communications.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The UE or terminal in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The base station or network side equipment in the present disclosure includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first node for wireless communication, comprising:

transmitting first information;

receiving second information;

transmitting a first bit-block set on a first time-frequency-resource block;

transmitting or dropping transmission of a third bit-block set on a third time-frequency-resource block; and receiving a second signal on a fourth time-frequency-resource block;

wherein the first information is used for indicating Q first-type time-frequency-resource blocks, Q being a positive integer greater than 1; the first time-frequency-resource block and the third time-frequency-resource block are two of the Q first-type time-frequency-resource blocks respectively; the first information is used for indicating that the fourth time-frequency-resource block is associated with the third time-frequency-resource block; the second information indicates that the fourth time-frequency-resource block is associated with the first time-frequency-resource block; the second signal is used for indicating whether a target bit-block set is correctly received; when the first node transmits the third bit-block set on the third time-frequency-resource block, the target bit-block set is the third bit-block set, otherwise the target bit-block set is the first bit-block set.

2. The method according to claim 1, comprising:

transmitting a first signaling on the first time-frequency-resource block;

wherein the first signaling is used for scheduling the first bit-block set; and the first signaling comprises third information, the third information being used for determining the third time-frequency-resource block.

3. The method according to claim 1, wherein the first information is used for indicating that a second time-frequency-resource block is associated with the first time-frequency-resource block; the second information is used for determining that the second time-frequency-resource block cannot be used by a transmitter of the second information for transmitting the second signal.

4. The method according to claim 3, comprising:
when the second information is not correctly received, receiving the second signal on the second time-frequency-resource block.

5. The method according to claim 1, comprising:
receiving fourth information; and
dropping reception of the second signal on the fourth time-frequency-resource block;
wherein the fourth information indicates that the fourth time-frequency-resource block cannot be used by a transmitter of the second information for transmitting a radio signal.

6. A method in a second node for wireless communication, comprising:
receiving first information;
transmitting second information;
receiving a first bit-block set on a first time-frequency-resource block;
monitoring a third bit-block set on a third time-frequency-resource block; and
transmitting a second signal on a fourth time-frequency-resource block;
wherein the first information is used for indicating Q first-type time-frequency-resource blocks, Q being a positive integer greater than 1; the first time-frequency-resource block and the third time-frequency-resource block are two of the Q first-type time-frequency-resource blocks respectively; the first information is used for indicating that the fourth time-frequency-resource block is associated with the third time-frequency-resource block; the second information indicates that the fourth time-frequency-resource block is associated with the first time-frequency-resource block; the second signal indicates whether a target bit-block set is correctly received; when the third bit-block set is detected on the third time-frequency-resource block, the target bit-block set is the third bit-block set, otherwise the target bit-block set is the first bit-block set.

7. The method according to claim 6, comprising:
receiving a first signaling on the first time-frequency-resource block;
wherein the first signaling is used for scheduling the first bit-block set; and the first signaling comprises third information, the third information being used for determining the third time-frequency-resource block.

8. The method according to claim 6, wherein the first information is used for indicating that a second time-frequency-resource block is associated with the first time-frequency-resource block; the second information indicates that the second time-frequency-resource block cannot be used by the second node for transmitting the second signal.

9. The method according to claim 8, comprising:
when the second information is not transmitted, transmitting the second signal on the second time-frequency-resource block.

10. The method according to claim 6, comprising:
receiving fourth information; and
dropping transmission of the second signal on the fourth time-frequency-resource block;
wherein the fourth information indicates that the fourth time-frequency-resource block cannot be used by the second node for transmitting a radio signal.

11. A first node for wireless communication, comprising:
a first transmitter, transmitting first information;
a first receiver, receiving second information;
the first transmitter, transmitting a first bit-block set on a first time-frequency-resource block;
the first transmitter, transmitting or dropping transmission of a third bit-block set on a third time-frequency-resource block; and
the first receiver, receiving a second signal on a fourth time-frequency-resource block;
wherein the first information is used for indicating Q first-type time-frequency-resource blocks, Q being a positive integer greater than 1; the first time-frequency-resource block and the third time-frequency-resource block are two of the Q first-type time-frequency-resource blocks respectively; the first information is used for indicating that the fourth time-frequency-resource block is associated with the third time-frequency-resource block; the second information indicates that the fourth time-frequency-resource block is associated with the first time-frequency-resource block; the second signal is used for indicating whether a target bit-block set is correctly received; when the first node transmits the third bit-block set on the third time-frequency-resource block, the target bit-block set is the third bit-block set, otherwise the target bit-block set is the first bit-block set.

12. The first node according to claim 11, comprising:
the first transmitter, transmitting a first signaling on the first time-frequency-resource block;
wherein the first signaling is used for scheduling the first bit-block set; and the first signaling comprises third information, the third information being used for determining the third time-frequency-resource block.

13. The first node according to claim 11, wherein the first information is used for indicating that a second time-frequency-resource block is associated with the first time-frequency-resource block; the second information is used for determining that the second time-frequency-resource block cannot be used by a transmitter of the second information for transmitting the second signal.

14. The first node according to claim 13, comprising:
when the second information is not correctly received by the first receiver, the first receiver receiving the second signal on the second time-frequency-resource block.

15. The first node according to claim 1, wherein the first receiver receives fourth information; the first receiver drops reception of the second signal on the fourth time-frequency-resource block; wherein the fourth information indicates that the fourth time-frequency-resource block cannot be used by a transmitter of the second information for transmitting a radio signal.

16. The present disclosure provides a second node for wireless communication, comprising:
a second receiver, receiving first information;
a second transmitter, transmitting second information;
the second receiver, receiving a first bit-block set on a first time-frequency-resource block;
the second receiver, monitoring a third bit-block set on a third time-frequency-resource block; and
the second transmitter, transmitting a second signal on a fourth time-frequency-resource block;
wherein the first information is used for indicating Q first-type time-frequency-resource blocks, Q being a positive integer greater than 1; the first time-frequency-resource block and the third time-frequency-resource block are two of the Q first-type time-frequency-resource blocks respectively; the first information is used for indicating that the fourth time-frequency-resource block is associated with the third time-frequency-resource block; the second information indicates that the fourth time-frequency-resource block is associated with the first time-frequency-resource block; the second signal indicates whether a target bit-block set is correctly received; when the third bit-block set is detected on the third time-frequency-resource block, the target bit-block set is the third bit-block set, otherwise the target bit-block set is the first bit-block set.

17. The second node according to claim 16, comprising:
the second receiver, receiving a first signaling on the first time-frequency-resource block;
wherein the first signaling is used for scheduling the first bit-block set; and the first signaling comprises third information, the third information being used for determining the third time-frequency-resource block.

18. The second node according to claim 16, wherein the first information is used for indicating that a second time-frequency-resource block is associated with the first time-frequency-resource block; the second information indicates that the second time-frequency-resource block cannot be used by the second node for transmitting the second signal.

19. The method according to claim 18, comprising:
when the second information is not transmitted by the second transmitter, the second transmitter transmitting the second signal on the second time-frequency-resource block.

20. The method according to claim 16, comprising:
the second receiver receiving fourth information; and
the second transmitter dropping transmission of the second signal on the fourth time-frequency-resource block;
wherein the fourth information indicates that the fourth time-frequency-resource block cannot be used by the second node for transmitting a radio signal.

* * * * *